(12) United States Patent
Krumm et al.

(10) Patent No.: US 10,614,364 B2
(45) Date of Patent: Apr. 7, 2020

(54) LOCALIZED ANOMALY DETECTION USING CONTEXTUAL SIGNALS

(71) Applicant: Microsoft Technology Licensing, LLC, Redmond, WA (US)

(72) Inventors: John Charles Krumm, Redmond, WA (US); Eric Joel Horvitz, Kirkland, WA (US); Jessica Kristan Wolk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 713 days.

(21) Appl. No.: 14/856,461

(22) Filed: Sep. 16, 2015

(65) Prior Publication Data

US 2017/0076217 A1   Mar. 16, 2017

(51) Int. Cl.
*G06N 7/00*   (2006.01)
*G06N 20/00*   (2019.01)
*G06Q 10/00*   (2012.01)

(52) U.S. Cl.
CPC .............. *G06N 7/005* (2013.01); *G06N 20/00* (2019.01); *G06Q 10/00* (2013.01)

(58) Field of Classification Search
CPC ........ G06N 7/005; G06N 99/005; G06N 5/04; G06N 3/08; G06Q 10/00
See application file for complete search history.

(56) References Cited

U.S. PATENT DOCUMENTS

| | | | |
|---|---|---|---|
| 7,310,590 B1 | 12/2007 | Bansal | |
| 7,908,076 B2 | 3/2011 | Downs et al. | |
| 8,090,592 B1 | 1/2012 | Goodall et al. | |
| 8,386,168 B2 | 2/2013 | Hao | |
| 8,583,584 B2 * | 11/2013 | Ruhl | ............ G06N 5/048 706/52 |

(Continued)

OTHER PUBLICATIONS

Ryong Lee and Kazutoshi Sumiya, "Measuring Geographical Regularities of Crowd Behaviors for Twitter-based Geo-social Event Detection", Nov. 2, 2010, In Proceedings of the 2nd ACM SIGSPATIAL International Workshop on Location Based Social Networks, pp. 1-10.*

(Continued)

*Primary Examiner* — Kamran Afshar
*Assistant Examiner* — Ying Yu Chen
(74) *Attorney, Agent, or Firm* — Schwegman Lundberg & Woessner, P.A.

(57) ABSTRACT

An expected value of a measurement in a first context may be inferred based at least partly on a contextual signal. The contextual signal may comprise an actual value that is: (i) of a same type as the expected value, and (ii) associated with a second context that is different from the first context (e.g., the contexts can comprise geographical areas), or the contextual signal may comprise an actual value that is: (i) of a different type than a type of the expected value, and (ii) associated with the first context, or a second context that is different from the first context. If a difference between the expected value and an actual value of the first context is greater than a threshold difference, this condition is considered an anomaly. A detected anomaly may be used to determine an event that may be significant or otherwise of interest to a user community.

20 Claims, 11 Drawing Sheets

(56) References Cited

U.S. PATENT DOCUMENTS

| | | | | |
|---|---|---|---|---|
| 9,043,329 | B1* | 5/2015 | Patton | G06F 17/3087 707/740 |
| 2011/0130950 | A1 | 6/2011 | Wexler et al. | |
| 2012/0278477 | A1* | 11/2012 | Terrell | H04L 41/5009 709/224 |
| 2012/0311030 | A1 | 12/2012 | Lin et al. | |
| 2013/0116965 | A1 | 5/2013 | Lin et al. | |
| 2013/0212048 | A1 | 8/2013 | Lien et al. | |
| 2014/0108640 | A1* | 4/2014 | Mathis | H04L 41/145 709/224 |
| 2014/0114556 | A1* | 4/2014 | Pan | G08G 1/00 701/119 |
| 2014/0335897 | A1* | 11/2014 | Clem | G08G 1/0112 455/456.3 |
| 2016/0062950 | A1* | 3/2016 | Brodersen | G06F 17/18 702/181 |

OTHER PUBLICATIONS

Alexander Boettcher and Dongman Lee, "EventRadar: A Real-Time Local Event Detection Scheme Using Twitter Stream", 2012, 2012 IEEE International Conference on Green Computing and Communications, Conference on Internet of Things, and Conference on Cyber, Physical and Social Computing, pp. 358-367.*

Alexander S. Szalay, Jim Gray, George Fekete, Peter Z. Kunszt, Peter Kukol, Ani Thakar, "Indexing the Sphere with the Hierarchical Triangular Mlesh", Aug. 2005, In Technical Report MSR-TR-2005-123, pp. 1-22.*

Donna J. Peuquet and Niu Duan, "An event-based spatiotemporal data model (ESTDM) for temporal analysis of geographical data", 1995 (published online Feb. 5, 2007), International Journal of Geographical Information Systems, 9:1, pp. 7-24.*

Shraddhanand Shukla, Christopher Funk, and Andrew Hoell, "Using constructed analogs to improve the skill of National Multi-Model Ensemble March-April-May precipitation forecasts in equatorial East Africa", Sep. 24, 2014, Environ. Res. Lett. 9 094009, p. 1-9. (Year: 2014).*

John Krumm, "Where will they turn: predicting turn proportions at intersections", 2010, Pers Ubiquit Comput (2010) 14, pp. 591-599. (Year: 2010).*

International Search Report and Written Opinion Issued in PCT Application No. PCT/US2016/050841, dated Nov. 3, 2016, 10 Pages.

Mahadevan, et al., "Anomaly Detection in Crowded Scenes", In Proceedings of IEEE Conference on Computer Vision and Pattern Recognition, Jun. 13, 2010, pp. 1975-1981.

Barford, et al.,"A signal analysis of network traffic anomalies", In Proceedings of the 2nd ACM SIGCOMM Workshop on Internet measurment, Nov. 6, 2002, pp. 71-82.

Teng, et al., "Adaptive Real-time Anomaly Detection Using Inductively Generated Sequential Patterns", In Proceedings of IEEE Computer Society Symposium on Research in Security and Privacy, May 7, 1990, pp. 278-284.

Abdelhaq, et al., "EvenTweet: Online Localized Event Detection from Twitter", In Proceedings of the VLDB Endowment, vol. 6, No. 12, Aug. 26, 2013, 4 pages.

Rattenbury, et al., "Towards Automatic Extraction of Event and Place Semantics from Flickr Tags", In Proceedings of the 30th annual international ACM SIGIR conference on Research and development in information retrieval, Jul. 23, 2007, pp. 103-110.

Osterhouta, et al., "Event-related potentials and syntactic anomaly: Evidence of anomaly detection during the perception of continuous speech", In Proceedings of Language and Cognitive Processes, vol. 8, Issue 4, Dec. 13, 2007, 2 pages.

Chandola, et al., "Anomaly Detection: A Survey", In Journal of ACM Computing Surveys, vol. 41, Issue 3, Jul. 2009, 58 pages.

Barford, et al., "Network Performance Anomaly Detection and Localization", In Proceedings of IEEE INFOCOM, Apr. 25, 2009, pp. 1377-1385.

Edwards, et al., "Traffic Trends Analysis using Neural Networks", In Proceedings of the International Workshop on Applications of Neural Networks to Telecommunications, Apr. 1, 1997, 8 pages.

Teevan, et al., "#TwitterSearch: A Comparison of Microblog Search and Web Search", In Proceedings of Fourth ACM International Conference on Web Search and Data Mining, Feb. 9, 2011, pp. 35-44.

Stricker, Gabriel, "The 2014 #YearOnTwitter", Published on: Dec. 10, 2014 Available at: https://blog.twitter.com/2014/the-2014-yearontwitter.

Lee, Chung-Hong, "Mining Spatia-Temporal Information on Microblogging Streams Using a Density-Based Online Clustering Method", In International Journal of Expert Systems with Applications, vol. 39, Issue 10, Aug. 2012, pp. 9623-9641.

Davis Jr., et al., "Inferring the Location of Twitter Messages Based on User Relationships", In Journal of Transactions in GIS, vol. 15, Issue 6, Dec. 2011, 21 pages.

Watanabe, et al., "Jasmine: A Real-time Local-event Detection System based on Geolocation Information Propagated to Microblogs", In Proceedings of 20th ACM International Conference on Information and Knowledge Management, Oct. 24, 2011, pp. 2541-2544.

Lee, et al., "A Novel Approach for Event Detection by Mining Spatio-Temporal Information on Microblogs", In Proceedings of International Conference on Advances in Social Networks Analysis and Mining, Jul. 25, 2011, pp. 254-259.

Ritter, et al., "Open Domain Event Extraction from Twitter", In Proceedings of 18th ACM SIGKDD International Conference on Knowledge Discovery and Data Mining, Aug. 12, 2012, pp. 1104-1112.

Lee, et al., "An Automatic Topic Ranking Approach for Event Detection on Microblogging Messages", In Proceedings of IEEE International Conference on Systems, Man, and Cybernetics, Oct. 9, 2011, pp. 1358-1363.

Popescu, et al., "Detecting Controversial Events from Twitter", In Proceedings of 19th ACM International Conference on Information and Knowledge Management, Oct. 26, 2010, pp. 1873-1876.

Yin, et al., "Geographical Topic Discovery and Comparison", In Proceedings of 20th International World Wide Web Conference, Mar. 28, 2011, pp. 247-256.

Samet, et al., "Reading News with Maps by Exploiting Spatial Synonyms", In Journal of Communications of the ACM, vol. 57, Issue 10, Oct. 2014, pp. 64-77.

Zhou, et al., "Event Detection over Twitter Social Media Streams", In International Journal on Very Large Data Bases, vol. 23, Issue 3, Jun. 2014, pp. 381-400.

Sakaki, et al., "Earthquake Shakes Twitter Users: Real-time Event Detection by Social Sensors", In Proceedings of 19th International Conference on World Wide Web, Apr. 26, 2010, pp. 851-860.

Hu et al. "What Were the Tweets About? Topical Associations between Public Events and Twitter Feeds", In Proceedings of 6th International Conference on Weblogs and Social Media, Jun. 4, 2012, 8 pages.

Szalay, et al., "Indexing the Sphere with the Hierarchical Triangular Mesh", In Technical Report MSR-TR-2005-123, Aug. 2005, pp. 1-22.

Lee, et al., "Measuring Geographical Regularities of Crowd Behaviors for Twitter-Based Geo-Social Event Detection", In Proceedings of the 2nd ACM SIGSPATIAL International Workshop on Location Based Social Networks, Nov. 2, 2010, pp. 1-10.

Friedman, Jerome H., "Greedy Function Approximation: A Gradient Boosting Machine", In Proceedings of the Annals of Statistics, vol. 29, No. 5, Oct. 2001, pp. 1189-1232.

Chae, et al., "Spatiotemporal Social Media Analytics for Abnormal Event Eetection and Examination Using Seasonal-Trend Decomposition", In Proceedings of IEEE Conference on Visual Analytics Science and Technology, Oct. 14, 2012, pp. 143-152.

Li, et al., "Twevent: Segment-Based Event Detection from Tweets", In Proceedings of the 21st ACM international conference on Information and knowledge management, Oct. 29, 2012, pp. 155-164.

Yin, et al., "A Unified Model for Stable and Temporal Topic Detection from Social Media Data", In Proceedings of 29th IEEE International Conference on Data Engineering, Apr. 8, 2013, pp. 661-672.

(56) References Cited

OTHER PUBLICATIONS

Diao, et al., "Finding Bursty Topics from Microblogs", In Proceedings of the 50th Annual Meeting of the Association for Computational Linguistics: Long Papers—vol. 1, Jul. 8, 2012, pp. 536-544.
Guille, et al., "Mention-anomaly-based Event Detection and tracking in Twitter", In Proceedings of IEEE/ACM International Conference on Advances in Social Networks Analysis and Mining, Aug. 17, 2014, 8 pages.
Marcus, et al., "Twitinfo: Aggregating and Visualizing Microblogs for Event Exploration", In Proceedings of the SIGCHI Conference on Human Factors in Computing Systems, May 7, 2011, pp. 227-236.
Inouye, et al., "Comparing Twitter Summarization Algorithms for Multiple Post Summaries", In Proceedings of IEEE Third International Conference on Privacy, Security, Risk and Trust and IEEE Third Inernational Conference on Social Computing, Oct. 9, 2011, pp. 298-306.
Vanderwende, et al., "Beyond SumBasic: Task-Focused Summarization with Sentence Simplification and Lexical Expansion", In Journal of Information Processing and Management, vol. 43, Issue 6, Nov. 2007, pp. 1-14.
Buhrmester, et al., "Amazon's Mechanical Turk: A New Source of Inexpensive, Yet High-Quality, Data?", In Proceedings of Perspectives on Psychological Science, vol. 6, No. 1, Jan. 2011, 7 pages.

\* cited by examiner

LOCALIZED ANOMALY DETECTION USING CONTEXTUAL SIGNALS

BACKGROUND

An anomaly may be characterized as something that deviates from the norm (or something abnormal). In some cases, an anomaly in data can be indicative of a surprising or interesting event. For example, eyewitnesses of a car accident may use their mobile devices to post about the car accident to a social media service shortly after the accident. The data that is collected by the social media service—in this case, user posts—can include information about the car accident, and the data may therefore be anomalous in that it deviates from the norm. Detecting such an anomaly in data may lead to useful insights, such as identifying the car accident before it is reported by major news outlets. Accordingly, anomaly detection lends itself to a variety of downstream applications, and improvements in anomaly detection are needed.

SUMMARY

Many occurrences can be characterized as a time series $y(t)$, where y is a measurement of something and t is time. A time series is therefore comprised of a series of data points, each data point representing a value of a measurement that is taken during a time interval, $\Delta T$. The value of the measurement can be, for example, a number of microblog posts (e.g., Tweets®), a number of vehicles, a number of items sold, a number of 911 calls, or any other suitable measurement. An anomaly occurs if an actual value of $y(t)$ is unusually large or small compared to a value of $y(t)$ that is expected under normal conditions. The value of $y(t)$ that is expected under normal conditions is referred to herein as "an expected value", called $\hat{y}(t)$.

Described herein are techniques and systems for accurately inferring an expected value, $\hat{y}(t)$, of a measurement based at least partly on a contextual signal, and using the expected value to automatically detect an anomaly. If a difference between $\hat{y}(t)$ and an actual value of $y(t)$ is greater than a threshold difference (i.e., if, at time t, $|\hat{y}(t)-y(t)|>X$, where X represents some threshold value), this condition is considered an anomaly. The use of one or more contextual signals for inferring the expected value, $\hat{y}(t)$, of a measurement allows for detecting anomalies that are localized to a particular context, such as anomalies within a limited geographical area. One example application of the anomaly detection techniques disclosed herein is for determining real-world events that may be significant or otherwise of interest to a user community. For example, an anomaly within a particular geographical area may be indicative of a significant real-world event in the particular geographical area, such as a car accident, a forest fire, a sports game, and the like.

In some embodiments, the contextual signal that is used for inferring the expected value, $\hat{y}(t)$, of a first context may comprise an actual value that is: (i) of a same type as the expected value, and (ii) associated with a second context that is different from the first context. One illustrative example of a "context" is a location (or a geographical area). Using this type of context as an example, the system may infer an expected value of a first geographical area based at least in part on an actual value that is: (i) of a same type as the expected value, and (ii) associated with a second geographical area that is different from the first geographical area. In other words, the actual value associated with the second geographical area may dictate the expected value of the first geographical area that is inferred by the system.

In some embodiments, the contextual signal that is used for inferring the expected value of a first context may comprise an actual value that is: (i) of a different type than a type of the expected value, and (ii) associated with the first context, or a second context that is different from the first context. Continuing with the above example where the context is a geographical area, the system may infer an expected value of a first type (e.g., a number of bald eagle sightings) for a first geographical area, where the inference is based at least in part on an actual value of a different type (e.g., a number of spotted owl sightings), wherein the actual value of the different type may be associated with the first geographical area or a second geographical area that is different from the first geographical area. In other words, the actual value of the one type (e.g., the number of spotted owl sightings) may dictate the expected value of another type (e.g., the number of bald eagle sightings).

After inferring the expected value, an anomaly detection process may be performed by comparing the expected value for a given context to an actual value of the given context to determine a difference, called a prediction error. Based on the prediction error, the system may determine that an anomaly has occurred.

Many of the examples discussed herein pertain to detecting an anomaly in data that includes geotagged microblog posts (e.g., geotagged Tweets®), although the techniques and systems are not so limited, as will be described in more detail below. Thus, examples throughout much of the disclosure focus on automatically detecting an anomaly for a particular geographical area in terms of an abnormally large or small number of geotagged microblog posts from the particular geographical area that are received over a time interval. Since some of the received microblog posts may relate to eyewitnesses posting about a local event in the real world, the anomaly detection techniques disclosed herein may be used to identify these types of events that are localized to the particular geographical area.

Notably, the techniques described herein for detecting local events from microblog posts, do not rely on examining text within the microblog posts in order to detect an anomaly that is indicative of a local event. Instead, it is adequate to detect anomalous spikes in a number of microblog posts from a particular geographical region. This omission of text analysis when detecting events from microblog posts reduces the overall computational cost and complexity involved in detecting local events from microblog data, as compared to existing event-detection systems that rely on text analysis to detect events from microblog data. It is to be appreciated, however, that some post-processing techniques (i.e., steps performed after an anomaly has been detected), as descried herein, may include analysis of the underlying content of the data.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
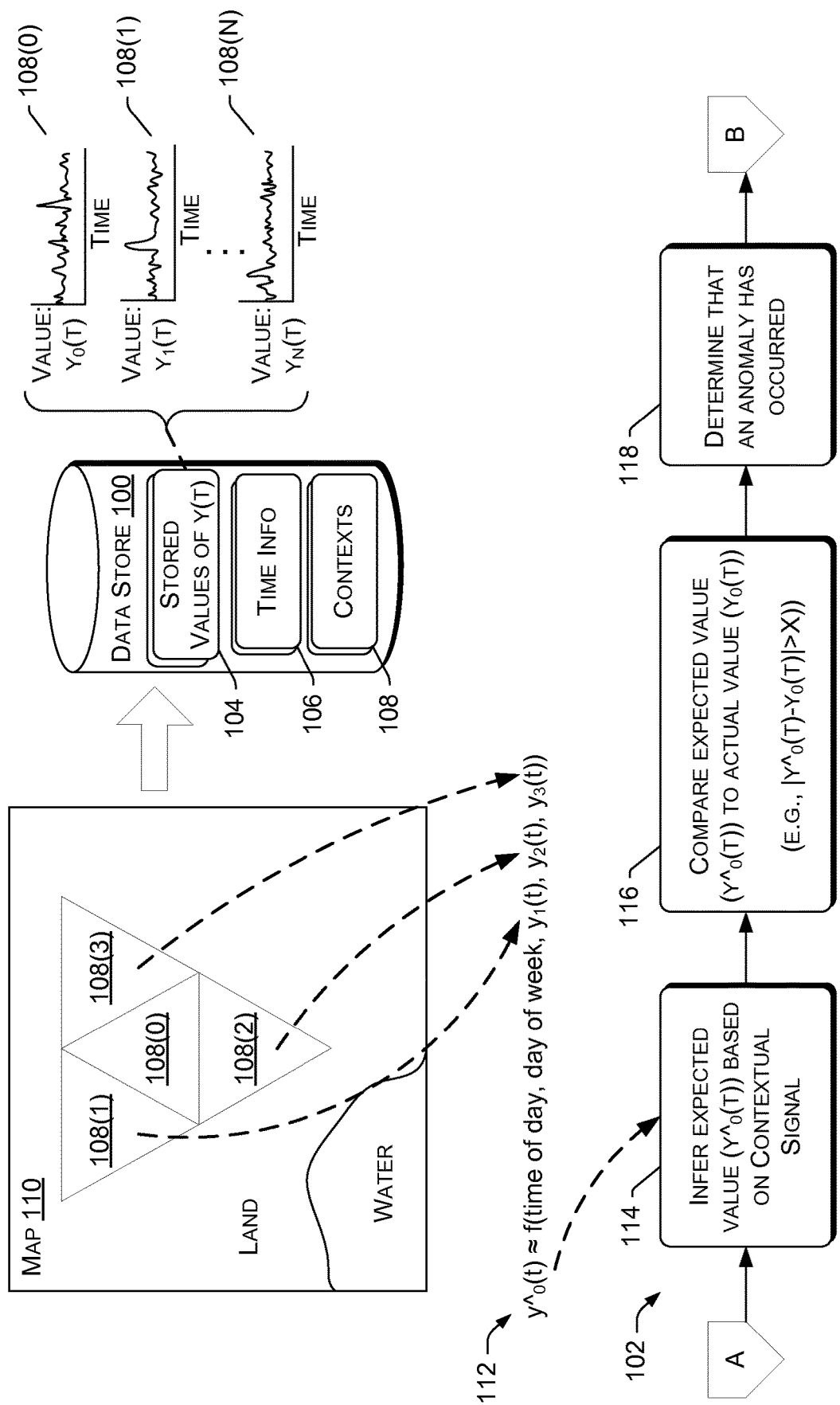
FIG. 1 is a schematic diagram of an example technique for inferring an expected value of a measurement based on one or more contextual signals, and using the expected value to automatically detect an anomaly in data.

FIG. 1 is a schematic diagram of an example technique for inferring an expected value of a measurement based on one or more contextual signals, and using the expected value to automatically detect an anomaly in data. FIG. 1 illustrates a data store 100, such as a database, that maintains collected data from which anomalies can be detected using a process 102. The data in the data store 100 may relate to anything that can be measured and characterized as a time series y(t), where y is a measurement obtained from the data, and t is time. Accordingly, the data store 100 may include stored values of y(t) 104 that constitute a series of data points of the time series y(t).

It is to be appreciated that the stored values of y(t) 104 may represent any measurable factor or occurrence. For example, the stored values of y(t) 104 may represent, without limitation, a number of crimes obtained from police department records, a number of microblog posts (e.g., Tweets®) obtained from a microblog service, a number of vehicles observed to be traveling on road networks obtained from departments of transportation, a number of observed tornados obtained from weather records, a number of blue jay sightings, a number of items (e.g., goods or services) sold to consumers, a number of emergency (e.g., 911) calls obtained from emergency dispatch systems, or any other suitable measurement. For simplicity, the stored values of y(t) 104 are described throughout much of this disclosure as representing a number of microblog posts received by a microblog service over a time interval. An example of a microblog post is a Tweet® using Twitter® as the microblog service.

Because the data in the data store 100 is collected over time, the data store 100 may further include time information 106, such as timestamps, associated with the data therein. The time information 106 allows for creating a time series y(t) of the data.

Furthermore, the data store 100 may include contexts 108 associated with the data therein, which allows for categorizing the stored values of y(t) 106 into one of the contexts 108. The contexts 108 may be derived from contextual information, such as geolocation that may be obtained from geotagged microblog posts. Furthermore, the contexts 108 may be used to determine adjacency relationships in the data. One illustrative example of a context 108, as used herein, is a geographical area, but it is to be appreciated that the contexts 108 are not so limited, as will be described in more detail below. A distance between any two geographical areas can be determined to establish adjacency relationships between geographical areas, and similar distance measures can be determined in other types of contexts 108. Because many of the examples herein pertain to detecting anomalies from geotagged microblog posts, the term "geographical area" may be used with reference numeral 108. However, it is to be appreciated that, although examples are described primarily with reference to geographical areas 108, the broader concept of contexts 108 apply to the described techniques.

FIG. 1 illustrates that the stored values of y(t) 104 may be grouped by geographical areas 108(0), 108(1), . . . , 108(N) based on contextual information (e.g., geotags) associated with the data. For example, the data store 100 may collect and maintain geotagged microblog posts that have been posted by users, via associated mobile devices, from within the different geographical areas 108(0)-108(3), as illustrated in the map 110 of FIG. 1. Accordingly, time series $y_0(t)$, $y_1(t)$, and $y_N(t)$ may be constructed for each of the different geographical areas 108. The map 110 can be related to an initial geographical area that has been segmented (or discretized) into a subset of geographical areas 108(0)-(3). Techniques for discretizing the initial geographical area will be discussed in more detail below.

An objective of the process 102 may be to detect an anomaly that is localized to the geographical area 108(0) and localized to a particular time based on the stored values of y(t) 104 in the data store 100. In this sense, the term "local" or "localized," as used throughout the disclosure means an anomaly or real-world event that is limited both temporally and contextually (e.g., geographically). In the example, the stored values of y(t) 104 may include a time series 108(0) (called $y_0(t)$) that represents a time series of any measured value, such as the number of microblog posts received from client devices within the geographical area 108(0). The stored values of y(t) 104 may also include a time series 108(1) (called $y_1(t)$) that represents a time series of the same type of measured value, such as the number of microblog posts received from client devices within the geographical area 108(1), and so on, for the different geographical areas 108(0)-(3) depicted in the map 110.

With access to the stored values of y(t) 104, the system may train a machine-learned inference function 112, such as a regression function. The inference function 112 may be configured to infer an expected value, $\hat{y}(t)$, for the geographical area 108(0). For example, the expected value, $\hat{y}(t)$, may comprise the expected number of microblog posts over a time interval, $\Delta T$. The expected value, $\hat{y}(t)$, that is inferred using the inference function 112 may be utilized in the process 102 for detecting an anomaly in the geographical area 108(0). A detected anomaly for the geographical area 108(0) may be indicative of a real-world event that is local to the geographical area 108(0), which may be of interest to users in a community.

FIG. 1 illustrates a flow diagram of an example process 102 for detecting anomalies that are localized to a particular context 108 (e.g., the geographical region 108(0)). The processes described herein are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some embodiments, one or more blocks of the processes may be omitted entirely.

At 114, the inference function 112 may be used to infer an expected value, $\hat{y}_0(t)$, for the geographical area 108(0) as a function of at least one contextual signal. In the example of FIG. 1, the contextual signal used to infer the expected value, $\hat{y}_0(t)$, comprises an actual value of y(t) associated with a different geographical area 108, such as at least one of the geographical areas 108(1)-(3). The geographical areas 108(1)-(3) are neighboring areas 108 of the geographical area 108(0) in that the geographical areas 108(1)-(3) are adjacent to the geographical area 108(0) of interest, but the actual value of y(t) used by the inference function 112 may be associated with a different geographical area 108 that is not directly adjacent to the geographical area 108(0). For example, the inference function 112 may use an actual value of y(t) that is associated with a geographical area 108 within a predetermined distance of the geographical area 108(0) of interest. This type of measurement may be made between center locations/points of the respective geographical areas 108, or between nearest points on the perimeters/borders of the respective geographical areas 108, and so on.

FIG. 1 illustrates an example where the inference function 112 infers the expected value, $\hat{y}_0(t)$, for the geographical area 108(0) as a function of the time of day, the day of the week, as well as the actual values of y(t) for the three neighboring/adjacent geographical areas 108(1)-(3). Here, the actual values of y(t) for the neighboring geographical areas 108(1)-(3) are represented in the inference function 112 of FIG. 1 as the parameters $y_1(t)$, $y_2(t)$, and $y_3(t)$. By inferring the expected value, $\hat{y}_0(t)$, for the geographical area 108(0) based in part on one or more actual values of y(t) associated with one or more of the adjacent/neighboring geographical areas 108(1)-(3), an anomaly may be detected that is localized to the geographical area 108(0), while anomalies that are not local to the geographical area 108(0) may be ignored. An example of an anomaly that is not local to a limited geographical area 108 may be an anomaly that is indicative of a large-scale news event, such as a political election or celebrity news that garners national or worldwide attention from the public because the news quickly spreads from its source without regard for location.

At 116, the expected value, $\hat{y}_0(t)$, may be compared to an actual value, $y_0(t)$, associated with the geographical area 108(0) to determine a difference between the two values. For example, the actual number of microblog posts communicated from mobile devices within the geographical area 108(0) over a time interval, ΔT, may be compared to the expected number of microblog posts over the time interval, ΔT, to determine a difference (or prediction error) between the actual and expected values. In some embodiments, a normalized prediction error may be compared to a threshold at 116. Normalizing the prediction error will be described in more detail below.

At 118, the system may determine that an anomaly has occurred based on the comparison at 116. In this manner, the process 102 may be utilized to detect an anomaly localized to the particular geographical area 108(0) (or, more broadly, to a particular context 108) of interest. The anomaly detected by the process 102 may lead to the identification of a real-world event that is local to the geographical area 108(0) and in some way significant, surprising, or otherwise interesting to the average person. For example, the number of microblog posts received from client devices within the geographical area 108(0) may spike to an abnormally high level if a forest fire breaks out in the geographical area 108(0). This spike in the number of microblog posts may be detected using the process 102, which may be indicative of the forest fire event that occurred in the geographical region 108(0).

Figure 2:
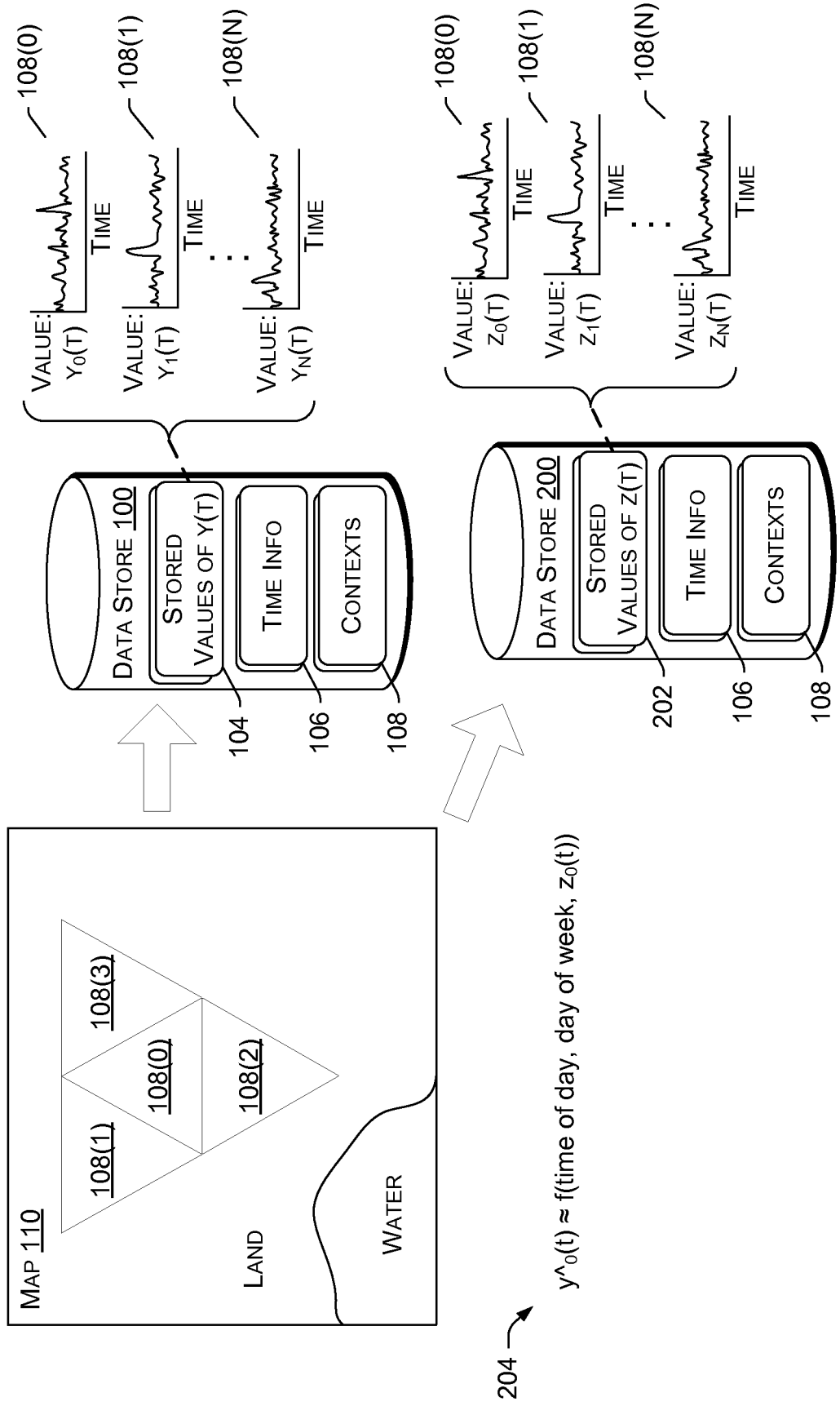
FIG. 2 is a schematic diagram of an example technique for inferring an expected value of a measurement according to another embodiment.

FIG. 2 is a schematic diagram of an example technique for inferring an expected value of a measurement according to another embodiment. In the example of FIG. 2, another data store 200 is shown in addition to the data store 100 introduced in FIG. 1. The data store 200 may also represent a database or a similar type of data repository as the data store 100, but the data store 200 may include stored values of z(t) 202, which represent values of a different type than the type of values represented by the stored values of y(t) 104 in the data store 100. For example, if the stored values of y(t) 104 represent a time series of a number of bald eagle sightings recorded for the various geographical areas 108(1)-(N), the stored values of z(t) 202 may represent a time series of a number of spotted owl sightings recorded for the various geographical areas 108(1)-(N).

With access to the stored values of y(t) 104 and the stored values of z(t) 202, the system may train a machine-learned inference function 204, such as a regression function. In the example of FIG. 2, the inference function 204 may be configured to infer an expected value, $\hat{y}(t)$, for the geographical area 108(0), much like the inference function 112 of FIG. 1, yet the inference function 204 infers the expected value, $\hat{y}(t)$, in a different manner. Thus, the process 102 of FIG. 1 may be implemented using the inference function 204 of FIG. 2.

Accordingly, at 114 of the process 102, the inference function 204 may be used to infer an expected value, $\hat{y}_0(t)$, for the geographical area 108(0) as a function of at least one contextual signal. In the example of FIG. 2, however, the contextual signal comprises an actual value of z(t) that is associated with either the same geographical area 108(0), or a different geographical area 108, such as at least one of the geographical areas 108(1)-(3) (e.g., a neighboring geographical area 108). FIG. 2 illustrates an example where the inference function 204 infers the expected value, $\hat{y}_0(t)$, for the geographical area 108(0) as a function of the time of day, the day of the week, as well as the actual value of $z_0(t)$ for the geographical area 108(0). For example, $z_0(t)$ may represent the actual number of spotted owl sightings in the geographical area 108(0), and may be used via the inference function 204 to infer the expected number of bald eagle sightings ($\hat{y}_0(t)$) in the geographical area 108(0). Thus, FIG. 2 illustrates a different form of contextual signal to that of the contextual signal described in FIG. 1 for inferring the expected value, $\hat{y}_0(t)$, for the geographical area 108(0). In either case, the use of a contextual signal, as described herein, for inferring the expected value, $\hat{y}_0(t)$, for the geographical area 108(0) allows for detecting anomalies that are localized to the particular context 108(0).

Figure 3:
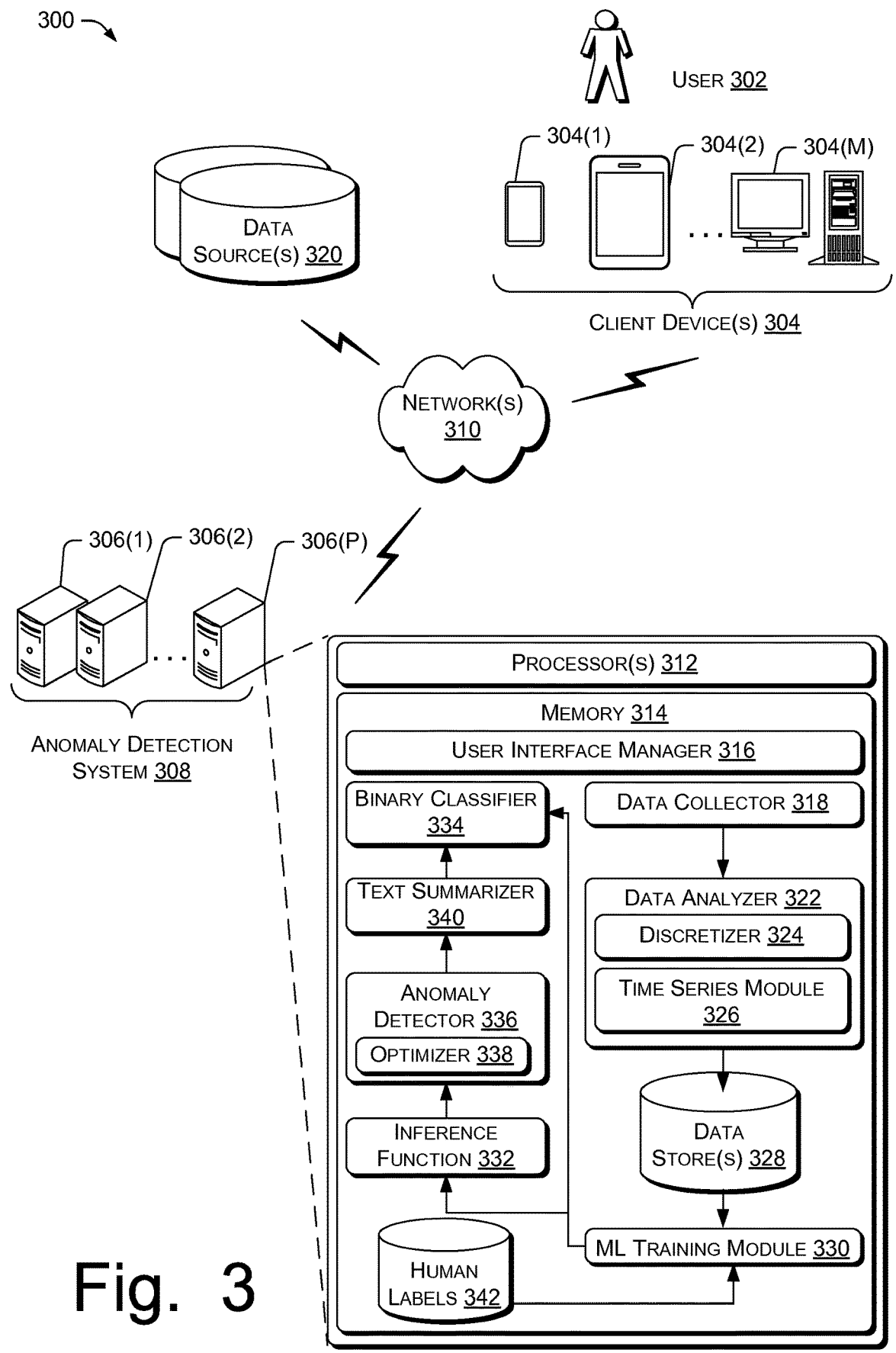
FIG. 3 illustrates an example environment for implementing the techniques and systems described herein.

FIG. 3 illustrates an example environment 300 for implementing the techniques and systems described herein. In the environment 300, a user 302 may utilize one or more client computing devices 304(1), 304(2), ..., 304(M) (collectively 304) to access one or more servers 306(1), 306(2), ..., 306(P) (collectively 306) of an anomaly detection system 308 via a network(s) 310. The terms "users," "consumers," "customers," or "subscribers" may be used interchangeably herein to refer to users, such as the user 302. The client computing devices 304 (sometimes referred to herein as "client devices 304") may be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (e.g., a smart watch, electronic "smart" glasses, a fitness tracker, etc.), or any other electronic device that can transmit/receive data over the network(s) 310. Users 302 may also use associated client device(s) 304 for other purposes than interfacing with the anomaly detection system 308, such as using the client device(s) 304 to submit/transmit a microblog post to a microblog service.

Furthermore, the network(s) 310 is representative of many different types of networks, and may include wired and/or wireless networks that enable communications between the various entities in the environment 300. In some embodiments, the network(s) 310 may include cable networks, the Internet, local area networks (LANs), wide area networks (WAN), mobile telephone networks (MTNs), and other types of networks, possibly used in conjunction with one another, to facilitate communication between the server(s) 306 and the client devices 304. Although embodiments are described in the context of a web based system, other types of client/server-based communications and associated application logic could be used.

The server(s) 306, which may be arranged in a cluster or as a server farm, and across multiple fleets of servers 306, may be maintained and/or operated by a provider of the anomaly detection system 308. The anomaly detection system 308 may provide a site (e.g., a website) or another type of information distribution platform with additional types of distribution channels (e.g., electronic mail (e-mail), mobile applications, etc.), and so on. The server(s) 306 are capable of handling requests from many client devices 304 and serving, in response, various information (e.g., web pages, application user interfaces, etc.) that can be rendered on displays of the client devices 304. The anomaly detection system 308 can be implemented as a portal that allows users 302 to browse information via the portal, to provide queries (e.g., search queries, standing queries, etc.) to the portal, and/or to receive information and notifications that are output via the client devices 304. For example, the anomaly detection system 308 may be implemented as an informational site, social networking site, e-commerce site, blog site, search engine site, news and entertainment site, and so forth.

In FIG. 3, the server(s) 306 are shown as being equipped with one or more processors 312 and one or more forms of computer-readable memory 314. The processor(s) 312 may be configured to execute instructions, applications, or programs stored in the memory 314. In some embodiments, the processor(s) 312 may include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof.

Computer-readable media may include two types of computer-readable media, namely computer storage media and communication media. The memory 314 is an example of computer storage media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that may be used to store the desired information and which may be accessed by the server(s) 306. Any such computer storage media may be part of the server(s) 306. In general, computer storage media may include computer-executable instructions that, when executed by the processor(s) 312, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The components included in the computer-readable memory 314 may include a user interface (UI) manager 316 to, among other things, receive requests (e.g., browsing requests, queries, etc.) from the client devices 304, and cause presentation or otherwise cause surfacing of various types of information and/or notifications on displays and/or other output devices (e.g., speakers, light emitting diodes (LEDs), etc.) associated with the client devices 304. For example, the user interface manager 316 may expose a graphical user interface (GUI) that allows a user 302 to input a standing query for notifications relating to anomalies detected in a particular geographical region 108(0), and/or a standing query for such notifications to be received during a period of time specified by the user 302 (e.g., 4:00 PM to 6:00 PM). The various UIs exposed by the UI manager 316 may surface information including, without limitation, events detected by the anomaly detection system 308, user settings controls, and the like.

The computer-readable memory 314 may further include a data collector 318 configured to collect or otherwise receive data from which anomalies are to be detected. The data collector 318 may be configured to access various data sources 320 via the network(s) 310 to obtain the data used by the anomaly detection system 308. For example, the data sources 320 may include a microblog service (e.g., Twitter®) that receives data regarding microblog posts (e.g., a stream of microblog posts from many users 302). In this sense, the data sources 320, in some cases, may generally include any type of data that pertains to use of (or user interaction with) the client device(s) 304 by a community of users 302. For example, the data sources 320 may include an emergency dispatch service that receives and records 911 calls made by the users 302. In some embodiments, the data collector 318 is configured to receive a stream of data from one or more of the data sources 320 in substantially real-time, as the data is received at the data sources 320. For example, the operator of the anomaly detection system 308 may establish an agreement with microblog service (an example data source 320) to receive, via the data collector 318, a stream of microblog posts from the microblog service in substantially real-time as the microblog posts are transmitted from the client devices 304 and received at the microblog service.

Additionally, or alternatively, the data collector 318 may access historical records from the data sources 320 that go back farther in time. Furthermore, the data obtained from the data sources 320 may not originate from use of (or user interaction with) the client devices 304. For example, the data sources 320 may include hospital records, crime records, weather records, and similar data that can be recorded without depending on the use of the client devices 304 by the users 302.

In some embodiments, the data collected by the data collector 318 may be processed and/or analyzed by a data analyzer 322 for various purposes. In some embodiments, the data collector 318 may access, from the data source(s) 320, map data that includes information on geographical areas that cover the surface of the Earth. The data analyzer 322 may include a discretizer 324 configured to discretize (or segment) space (e.g., the surface of the Earth) discrete portions, as well as to discretize time into time intervals. The discretization of space and time by the discretizer 324 may result in a space-time ordered pair (S, T). The discretizer 324 may discretize space and time separately.

Figure 4:
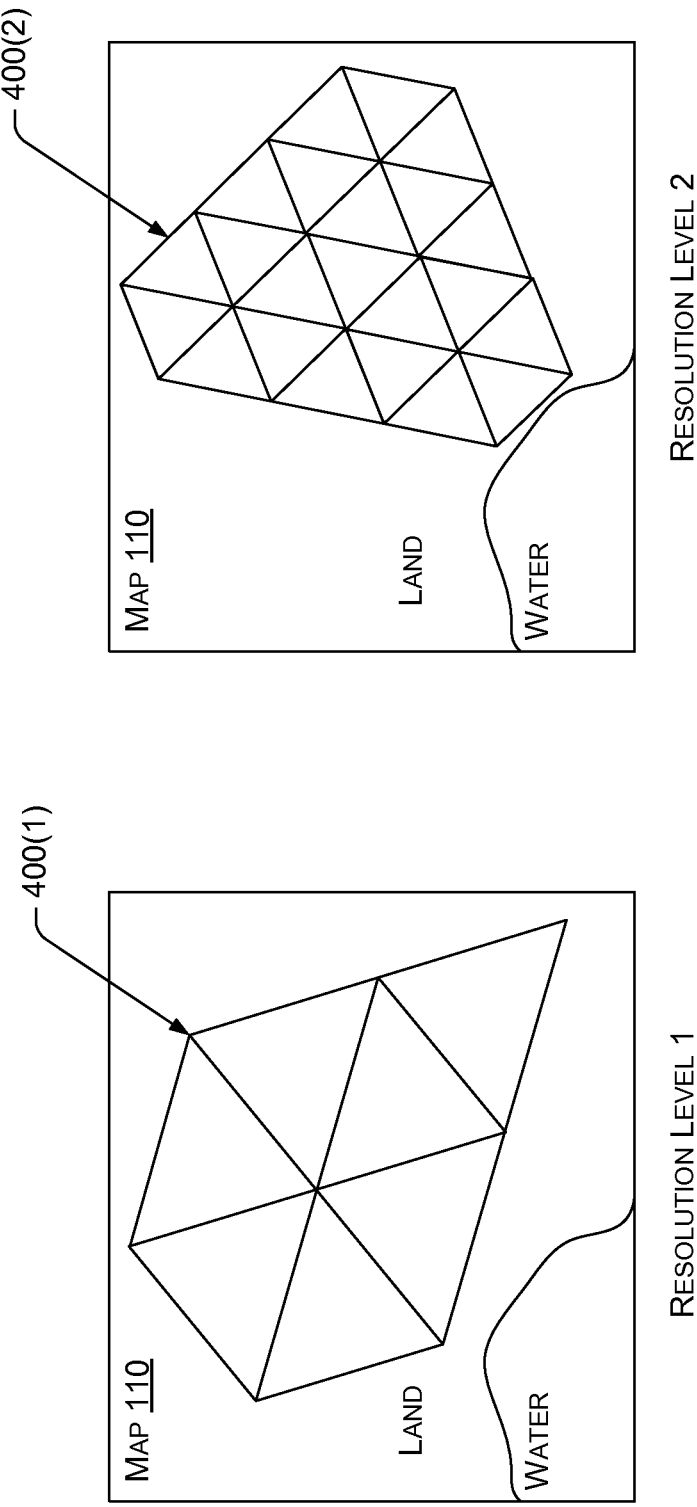
FIG. 4 illustrates an example technique for discretizing a geographical area using a hierarchical triangular mesh (HTM).

In a geographical context, space (e.g., the surface of the Earth or a portion thereof) may be discretized in various ways. Referring briefly to FIG. 4, an example technique of discretizing space includes discretizing a geographical area represented by the map 110 into a triangular tessellation, which is depicted in FIGS. 1 and 2 as well. FIG. 4 illustrates an example technique of discretizing space using a hierarchical triangular mesh (HTM) 400. The HTM 400 may be formed at various, discrete levels of resolution, and FIG. 4 shows two possible resolution levels: HTM 400(1) and 400(2). Here, the initial geographical area in the map 110 can be discretized (or segmented) into relatively larger sub-areas or sections at resolution level 1, and/or relatively smaller sub-areas or sections at resolution level 2. In some embodiments, as the resolution levels of the HTM 400 increase (e.g., from HTM 400(1) to HTM 400(2)), the transition from one resolution level to a higher resolution level may include dividing each triangle in the original HTM (e.g., HTM 400(1)) into multiple (e.g., four) smaller triangles. The discretizer 324 may be configured to discretize space at any suitable resolution within a range of resolution levels, where each level may correspond to a particular size or distance dimension that relates the resolution level to an actual size of a geographical area 108 in the HTM 400. Table 1, below, shows example resolution levels that may be defined for discretizing space with an HTM 400:

TABLE 1

Sizes of geographical areas (triangles) for spatial grid

| HTM Level | Side Length (km) | Area (km$^2$) |
| --- | --- | --- |
| 8 | 62.4 | 972.9 |
| 9 | 31.2 | 243.2 |
| 10 | 15.6 | 60.8 |
| 11 | 7.8 | 15.2 |

The resolution levels shown in FIG. 4 may represent any two of the HTM levels listed in the far left column of Table 1, above. As shown in Table 1, a range of resolution levels for discretizing space may include HTMs 400 with triangles (or sub-areas/cells of the HTM 400) having areas within a range of about 15.2 square kilometers (km$^2$) to about 972.9 km$^2$. In general, a set of multiple areas or sections (e.g., a grid of cells) covering a surface (e.g., the surface of the Earth) at resolution level L may be referred to as $S^L$. Accordingly, a spatial component of the space-time ordered pair (S, T) may be $S \in S^L$ for whichever level $L \in \{8, 9, 10, 11\}$ that is utilized. It is to be appreciated that other triangle sizes than the sizes shown in Table 1 may be utilized for discretizing of an initial geographical area. In the example of microblog posting, the range of resolution levels shown in Table 1 may encompass a spatial scale over which users 302 post microblogs about a local event (e.g., a fire, a car accident, a traffic jam, etc.). Since the anomaly detection system 308 detects local anomalies and corresponding events, triangles of much larger sizes may not comport with the goal of detecting local events.

In some embodiments, the discretization of space (an initial geographical area) may be substantially uniform in that the sections that make up the discretization are of substantially equal size. The HTM 400 comprises a 2D tessellation of a surface, such as a surface of a sphere (e.g., the Earth), consisting of a plurality of substantially equilateral triangles of substantially equal size. Of course other forms of discretization that use different shapes (e.g., a square grid, or other polygonal tessellations, etc.) may be implemented by the discretizer 324 in order to discretize space. Furthermore, the discretizer 324 may be configured to discretize three-dimensional spaces, as well as two-dimensional spaces/areas, by accounting for a vertical component (e.g., altitude in the geographical example). However, in many cases, discretization in two dimensions is sufficient.

The discretizer 324 may also be configured to discretize time. The assumption here is that events occur over different durations of time. To capture a range of events of different durations, the discretizer 324 may discretize time into periods of length, $\Delta T$, which yields a set of time periods. In some embodiments, the actual value of y(t) for a given time period, $\Delta T$, may be determined by summing up multiple values measured within the time period, $\Delta T$, or determining an integral over the time period, $\Delta T$. One example set of time periods is $T_a^{\Delta T} \stackrel{\text{def}}{=} \{ \ldots, [-2\Delta T, -\Delta T), [-\Delta T, 0), [0, \Delta T), [\Delta T, 2\Delta T), \ldots \}$. These time periods are disjoint time intervals with length, $\Delta T$. Events and corresponding anomalies in data may not fall neatly on these time boundaries, so a technique to account for this is to use a set of discretized time periods offset by $\Delta T/2$. This set is $$T_b^{\Delta T} \stackrel{\text{def}}{=} \left\{ \ldots, \left[-\frac{3\Delta T}{2}, \frac{-\Delta T}{2}\right), \left[\frac{-\Delta T}{2}, \frac{\Delta T}{2}\right), \left[\frac{\Delta T}{2}, \frac{3\Delta T}{2}\right), \ldots \right\}.$$

Figure 5:
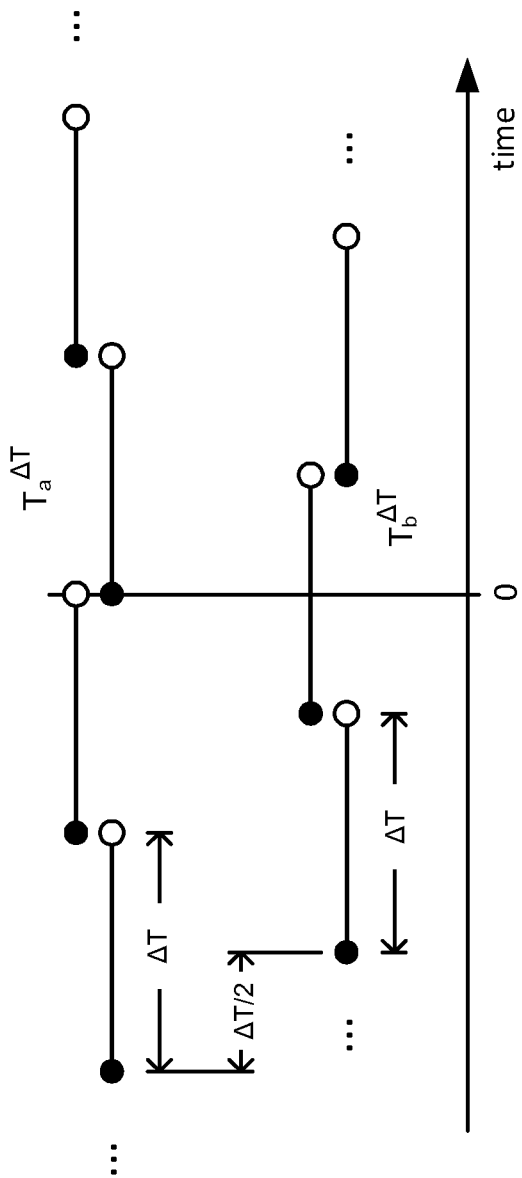
FIG. 5 illustrates an example technique for discretizing time into two sets of time discretizations that are offset from each other.

$T_a^{\Delta T}$ and $T_b^{\Delta T}$ are illustrated in FIG. 5, and represent two sets of time discretizations that are the same except the time discretizations are offset from each other by $\Delta T/2$ in an effort to detect local anomalies (and corresponding events) starting near even or odd multiples of $\Delta T/2$. Thus, the temporal component of the space-time ordered pair (S, T) may be $T \in T_a^{\Delta T}$ or $T \in T_b^{\Delta T}$. In some embodiments, the discretizer 324 may discretize time into time intervals of different durations within a range of durations (a hierarchy of time intervals). One example hierarchy of time intervals in which time may be discretized includes $\Delta T \in \{20$ min, 1 hr, 3 hr, 6 hr, 12 hr, 24 hr$\}$. In an illustrative example, the value of $\Delta T$ may correspond to estimates of the length of time users 302 tend to author microblog posts in response to a local event.

In some embodiments, the discretizer 324 may be configured to create spatio-temporal discretizations in the form of prisms, each prism having one dimension that represents a time interval. Each discrete time duration in a hierarchy of time intervals may be combined with a spatial discretization at a particular resolution level to create a plurality of combinations of L×ΔT space-time discretizations. An example objective of the techniques described herein is therefore to determine whether an anomalous difference in actual vs. expected values occurs within a space-time discretization (i.e., prism). If an anomalous difference is detected for a space-time discretization, an anomaly is detected, which may be indicative of a local event. Table 2 shows an example of different possible space-time discretizations:

TABLE 2

Combinations of space and time discretizations

| | | Duration (hours) | | | | | |
|---|---|---|---|---|---|---|---|
| | | 0.33 | 1 | 3 | 6 | 12 | 24 |
| HTM Level | 8 | | | | | | |
| | 9 | | | | | | |
| | 10 | | | | | | |
| | 11 | | | | | | |

Recall from Table 1 that the HTM levels correspond to different sizes of the discretized geographical areas. Some local events like earthquakes occur over a larger area than others, such as sports events in stadiums. Similarly, local events occur over different time durations. This is why "sweeping" over a set of different spatial resolutions and time intervals can be beneficial. By varying the spatial and temporal resolution of a time series, the anomaly detection system 308 can detect local events at different scales of space and time. Multiple combinations of resolutions, L×ΔT, may be used to construct multiple different space-time resolutions. Some sizes of space-time prisms tend to capture significant local events more than others. This captures the different levels at which humans experience events.

Returning to FIG. 3, the data analyzer 322 may further include a time series module 326 configured to construct a discrete time series of a measured value, y(t), such as a number of microblog posts, from a particular geographical area 108 (or a time series for each discrete space-time prism), where each data point in the time series represents the measured value over a time period, $\Delta T$. In some embodiments, the time series may be denoted $y_{S,t}^{(L,\Delta T)}$, wherein (L, $\Delta T$) refers to one of a plurality of spatial and temporal resolutions, S indexes over the geographical areas 108 (e.g., triangles in the HTM 400 tessellation), t indexes over the discrete time intervals, and y is the measured value within the geographical area 108 (e.g., triangle S) over discrete time period t. For simplicity of notation, the (L, $\Delta T$) superscript and the S subscript may be omitted throughout this disclosure, but it is to be appreciated that the time series module 326 may construct a separate time series for each geographical area 108 (e.g., each triangle S in an HTM 400 tessellation), for each triangle size L, and for each time discretization $\Delta T$. In some embodiments, the time series module 326 may construct individual time series for each of the time discretizations $T_a^{\Delta T}$ and $T_b^{\Delta T}$ noted herein, and as depicted in FIG. 5. Accordingly, a time series representing a value (e.g., a number of geotagged microblog posts) associated with a particular geographical area 108 at some spatial and temporal resolution may be simply denoted as $y_t$.

The data collected by the data collector 318, and processed/analyzed by the data analyzer 322, may be maintained in one or more data stores 328, which may represent the data stores 100 and/or 200 introduced in FIGS. 1 and 2, or similar data stores. Accordingly, the data store(s) 328 may at least maintain the stored values of y(t) 104 for a first type of value (e.g., a number of 911 calls), as well as stored values of other types, such as the stored values of z(t) 202 that may be of a different type than the stored values of y(t) 104.

The computer-readable memory 314 may further include a machine learning (ML) training module 330 configured to train an inference function 332 and a binary classifier 334. The inference function 332 may represent one or both of the inference functions 112 or 204 introduced in FIGS. 1 and 2, or similar inference functions. The inference function 332 may be configured to infer an expected value, ŷ(t), for a particular geographical area 108 (or more broadly a particular context 108), over a time interval, $\Delta T$. For example, the inference function 332 may be trained to infer an expected number of geotagged microblog posts over a time interval, $\Delta T$. In an example, the inference function 332 comprises a regression function that infers time series values based on a number of parameters, as shown in Equation 1 below:

$$\hat{y}_t = f(\bar{\theta}_t) \qquad (1)$$

In Equation (1), $\hat{y}_t$ is an expected value (e.g., an expected number of microblog posts received by a microblog service) for a particular geographical area 108, f(·) is a learned regression function, and $\bar{\theta}_t$ is a vector of multiple numerical features. In some embodiments, the features of the vector $\bar{\theta}_t$ include, without limitation, the time of the day, the day of the week, and the actual values (e.g., actual number of microblog posts) from geographical areas 108 that neighbor the particular geographical area 108 of interest (e.g., the neighboring triangles 108(1)-(3) of FIG. 1). The "time of day" and "day of week" parameters of the example inference function 332 capture any regular time-varying changes in a measured value. For example, when the measured value for the time series y(t) represents a number of microblog posts, this measured value may rise during the day when most people are awake, and fall during the night when most people are asleep. Furthermore, there may be a consistent spike in the number of microblog posts on Saturday evenings. In this manner, the "time of day" and "day of week" parameters allow the inference function 332 to infer this so that it is not mistaken as an anomaly in the data.

Furthermore, as noted above, the parameters of the inference function 332 that represent the actual values associated with geographical areas 108 that neighbor the geographical area 108(0) of interest allow for the detection of anomalies and corresponding events that are local to the geographical area 108(0). That is, the system can detect anomalous spikes in the actual value of y(t) that are spatially isolated to the particular geographical area 108(0) of interest. Moreover, if actual values in neighboring geographical areas 108 rise (or fall) and correctly predict a rise (or fall) of the actual value in the geographical area 108(0) of interest, this may mean that the associated event is at a larger spatial scale than the particular geographical area 108(0) under consideration, and the event is likely to be detected by the same analysis performed at lower spatial resolutions (i.e., spatial discretizations of larger size). Thus, "sweeping" through different spatial resolutions created by the discretizer 324 allows for finding events at the right scale. In some embodiments, each spatial resolution level (e.g., each triangle size), may be examined. In other embodiments, to reduce processing cost, a subset of the geographical areas 108 (e.g., triangles) that cumulatively contain a predetermined number or percentage (e.g., 95%) of the total measured values over period of time may be examined to the exclusion of other areas that are not part of the subset. This ignores many areas where there is very little activity (few measured values) and can increase processing speed and reduce computational cost of the anomaly detection process.

Detecting spatially isolated anomalies also means that large-scale events (e.g., news events such as a political election, celebrity news, etc.) are ignored. Such large-scale events are likely to be captured by trending keywords in the "microblog" example, because news quickly spreads from its source without regard to location.

In some embodiments, the inference function 332 comprises a FastRank regression tree, which is an efficient version of the Multiple Additive Regression Trees (MART) gradient boosting algorithm. The FastRank regression tree can learn (or train) an ensemble of decision trees, where the next tree in the ensemble is designed to correct the mistakes of the earlier trees. In an example, the FastRank regression tree may be set up with a maximum number of leaves per tree of 32, a minimum number of training instances in each leaf of 20, and 500 trees per ensemble. There may be an ensemble of trees that is learned or trained for each time series across all geographical areas 108 (e.g., triangles), all sizes, L, of the geographical areas 108, and all time intervals, $\Delta T$. Regression using decision trees produces a piecewise constant function. One convenient aspect of decision trees is that no normalizing nor preconditioning of the training data is necessary.

Figure 6:
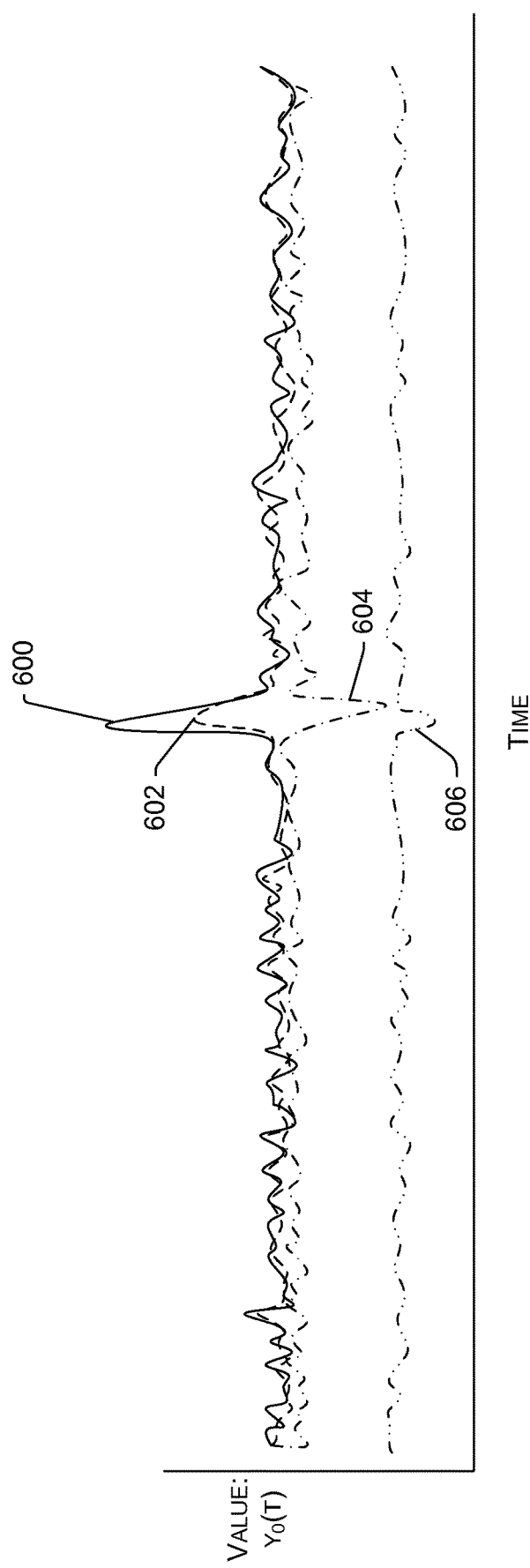
FIG. 6 illustrates an example partial time series of a measured value for a particular geographical area.

Referring briefly to FIG. 6, an example partial time series 600 of a measured value, $y_0(t)$ is shown for a particular geographical area, such as the geographical area 108(0). The partial time series 600 may comprise a plurality of data points plotted over time, each data point representing a measured value, such as a number of microblog posts received from mobile devices within the geographical area 108(0) of FIG. 1 over a time interval, $\Delta T$, which illustrates a periodic, albeit noisy, daily pattern in the number of microblog posts recorded. There is also an observable spike in the measured value (number of microblog posts), which the process 102 of FIG. 1 is configured to detect.

To find anomalies, the inference function 332 is used to infer expected values (e.g., number of microblog posts) for a particular geographical area 108(0) over a time. In FIG. 6, a partial expected time series 602 (a time series of expected values 602), denoted $\hat{y}_t$, is shown plotted on the same scale as the partial time series 600 of actual values. A time series of prediction errors 604 (the prediction error at time t being $e_t = \hat{y}_t - y_t$) can be plotted to show the difference between the actual and expected values over time. A large negative (or positive) prediction error 604 may be detected as an anomaly by the process 102, and may be indicative of a local event, because it means there were many more (or fewer) microblog posts than the number of microblog posts to be expected under normal conditions. The sample standard deviation of the prediction error 604, denoted $s_t$, measures the precision of the inference function 332. The overall precision of the inference function 332 varies from geographical area 108 to geographical area 108. To account for this variation, the prediction error 604 as a multiple of the inference function's 332 precision (called the normalized error 606), i.e. $e_t/s_t$, can be measured. FIG. 6 illustrates that the normalized error 606 dips dramatically at the point of the anomalous spike in the measured value. In some embodiments, the comparison at 116 of the expected value to the actual value comprises comparing the normalized error 606 to a threshold error (e.g., −3.0), which means that the actual value exceeded the expected value by at least three times the standard deviation of the prediction error 604. Normalizing the prediction error 604 by the standard deviation (to obtain the normalized error 606) allows for applying a single threshold to all geographical areas 108 while still accounting for the variation in the inference function's 332 prediction error 604 from location to location. In other words, the system automatically adjusts for its sensitivity based on the precision of the inference function 332 by using a normalized error 606 threshold. Using a single threshold for anomaly detection in all geographical areas 108 allows for conserving memory and reducing processor load by more efficiently executing such comparisons.

Although an example of the inference function 332 is provided in the form of a regression function, it is to be appreciated that the inference function 332 may be implemented as other functions or machine learning models. For example, suitable machine learning models for use as the inference function 332 may include, without limitation, logistic regression-based classification models, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, or an ensemble of one or more of the aforementioned techniques.

The output of the inference function 332 (i.e., the expected value for a particular geographical area 108) may be used by an anomaly detector 336 to detect anomalies, such as by implementing the process 102 described herein. In some embodiments, the anomaly detector 336 may include an optimizer 338 that is configured to optimize for a large number of inference functions 332, since a plurality of inference functions 332 may be trained. That is, an inference function 332 may be trained for each geographical area 108 in a set of many geographical areas 108, and across several spatio-temporal resolutions. Accordingly, the optimizer 338 may be used to allow for scaling the anomaly detection system 308 to a large number of geographical areas 108 (and thus a large number of inference functions 332.

In some embodiments, the optimizer 338 may analyze, prior to loading and executing an inference function 332 for a particular geographical area 108, a time series of actual values (e.g., numbers of microblog posts) for the particular geographical area 108 and/or additional features of the particular geographical area 108 to determine whether a qualifying condition is met. For example, the optimizer 338 may determine if the actual value of a measurement for the particular geographical area 108 is below a threshold value, which threshold may be based on an average value or another suitable metric. If the optimizer 338 determines that the geographical area's 108 actual value of a measurement is below the threshold (e.g., well below average), the anomaly detector 336 may refrain from executing the inference function 332 for that geographical area 108 because the likelihood of an anomaly being detected in that geographical area 108 is low. This pre-processing step may reduce time spent on anomaly detection, conserve memory, and/or reduce processor load when a large number of geographical areas 108 are to be considered/evaluated for anomalies. Another example of a pre-processing technique that can be implemented by the optimizer 338 is to determine whether a time series of a neighboring/adjacent geographical area 108 has an actual value of a measurement that is below a threshold value, and if so, the anomaly detector 336 may refrain from executing the inference function 332 for the geographical area 108 of interest.

In some embodiments, the optimizer 338 may select a neighboring geographical area 108 that is the "best" predictor of the value in the geographical area 108 of interest. The determination of which neighboring area 108 is the best predictor may be based on historical data that includes statistics regarding the correlation between actual values of a measurement in two neighboring geographical areas 108. In some embodiments, the optimizer 338 may evaluate the above-mentioned thresholds for a period of time, wherein the optimizer 338 may take an average measured value over the period of time and compare the average measured value to the threshold, or the optimizer 338 may determine whether the threshold is crossed at any point during the time period, and so on. In some embodiments, the optimizer 338 is configured to categorize a plurality of geographical areas 108 into one of two categories: (i) geographical areas 108 with actual values that are likely to signal anomalies (meaning that a qualifying condition is met and the inference function 332 is to be executed by the anomaly detector 336), and (ii) geographical areas 108 with actual values that are unlikely to signal anomalies (meaning that a qualifying condition is not met and the anomaly detector 336 is to refrain from executing the inference function 332).

As noted above, detected anomalies may be indicative of local events in a geographical area 108 of interest. The anomaly detection system 308 may be configured to detect many types of events including, without limitation, sports, extreme weather, natural disasters, crimes, accidents, protests, gatherings, concerts, festivals, sports games, conventions, conferences, and the like. When an anomaly in the number of microblog posts is detected by the anomaly detector, this anomaly detection may trigger a text summarizer 340 to process text contained in the microblog posts for purposes of summarizing (creating a text summary of) an event that is suspected to correspond to the detected anomaly. In some embodiments a text summary may include an extracted sample of microblog posts centered around the detected anomaly in space and time. The text summarizer 340 may utilize a text summarization algorithm to extract a sample microblog posts (e.g., 5 microblog posts) that describe the event corresponding to the detected anomaly. This operations on an assumption that the microblog posts associated with a local event will give a meaningful summary of the event for human consumption by users 302.

The text summarizer 340 may be configured to examine text of a portion of the microblog posts in the data store 328 and extract a sample of microblog posts to be presented via the user interface manager 316, choosing the microblog posts that are likely to be representative of the event. In some embodiments, the text summarizer 340 utilizes a frequency-based summarizer, such as SumBasic, Hybrid term frequency-inverse document frequency (TFIDF), or the like. The text summarizer 340 may consider each microblog post to be a sentence, and after removing stop words, may compute the frequency of each word in the collection of microblog posts. The text summarizer 340 may then iteratively choose the microblog posts having the highest frequency words. Once a microblog post is chosen for inclusion in a text summary of the event, the frequency values of its constituent words may be reduced, leading to a diversity of words in the choice of subsequent microblog posts.

In some embodiments, anomalies that are detected by the anomaly detector 336 may be designated as candidate local events that are provided to the binary classifier 334. The binary classifier 334 may be configured to determine if the candidate local event is a real event. In other words, it is recognized that the anomaly detector 336 may output anomalies that do not correspond to local events (e.g., merely a random uptick in microblog activity that is unrelated to a local event). To create ground truth data for training the binary classifier 334, the candidate local events output by the anomaly detector 336 may be judged by humans. The human judges may view a text summarization from the text summarizer 340 and may be asked to label the candidate event as to whether or not they think the candidate event is a real event. This labeled data may be stored in a data store of human labels 342, thereby providing the ground truth set of positive and negative instances of local events that can be used for training and testing the binary classifier 334.

Taking the human labels 342 of the detected candidate events as ground truth, the machine learning training module 330 may train the binary classifier 334 on the human labels 342 so that the binary classifier 334 can recognize real events among candidate events that are provided to the binary classifier 334 as input. In some embodiments, the binary classifier 334 may comprise a decision tree classifier. In some embodiments, the machine learning training module 330 computes a feature vector for each candidate local event and trains the binary classifier 334 to estimate the probability of the candidate event actually being a real event. In some embodiments, the binary classifier 334 comprises a FastRank classifier that results in an ensemble of decision trees with the aim of producing a probability indicative of a likelihood that a candidate local event is actually a local event. Example features that may be used for a candidate event in a space-time prism (S, T) are: 1. spatial size of space-time samples (e.g., from $L \in \{8, 9, 10, 11\}$ in Table 1); 2. Duration of space-time samples, e.g., from $\Delta T \in \{20$ min, 1 hr, 3 hr, 6 hr, 12 hr, 24 hr$\}$; 3. Day of week, 0-6; 4. Weekend or weekday, binary; 5. Actual value in the space-time prism, i.e., $y_t$; 6. Prediction error 604 (i.e., difference between the actual value and the expected value: $e_t = \hat{y}_t - y_t$); 7. Prediction error 604 divided by the actual value $e_t/y_t$; 8. Prediction error 604 divided by the standard deviation of the prediction error 604 $e_t/s$; 9. The number of distinct users 302 (e.g., users that provided the data via interaction with associated client devices 304); 10. Average length of microblog posts (e.g., average number of characters, average number of words, etc.); and so on. The binary classifier 334 may return a class (e.g., event or not event) probability, and the final classification may be based on thresholding this probability. The threshold probability for classification may be adjusted to adjust the sensitivity of the binary classifier 334. A low threshold will lead to more local event detections (i.e., more false positives and more true positives), while a higher threshold will lead to fewer local event detections.

Although an example of the binary classifier 334 is provided in the form of a decision tree classifier, it is to be appreciated that the binary classifier 334 may be implemented as other functions or machine learning models, such as those mentioned above for the possible examples of inference functions 332.

In some embodiments, the anomaly detection system 308 may be configured to detect local events in substantially real-time. Recall that an inference function 332 may be used in the form of a regression function $\hat{y}_t = f(\overline{\theta}_t)$ to infer the expected value at time t within a geographical area 108 of interest. Instead of using parameters' actual values from the one or more neighboring geographical areas 108 at time t (i.e., instead of waiting for those counts to accumulate before making the inference of the expected value), which introduces a temporal lag of $\Delta T$, the actual values from one or more different (e.g., neighboring) geographical areas 108 measured at a previous time interval (i.e., $y_{t-1,(i)}$, $i \in \{1, 2, 3\}$) may be used in the inference function 332; namely the inference function 112 of FIG. 1.

Figure 7:
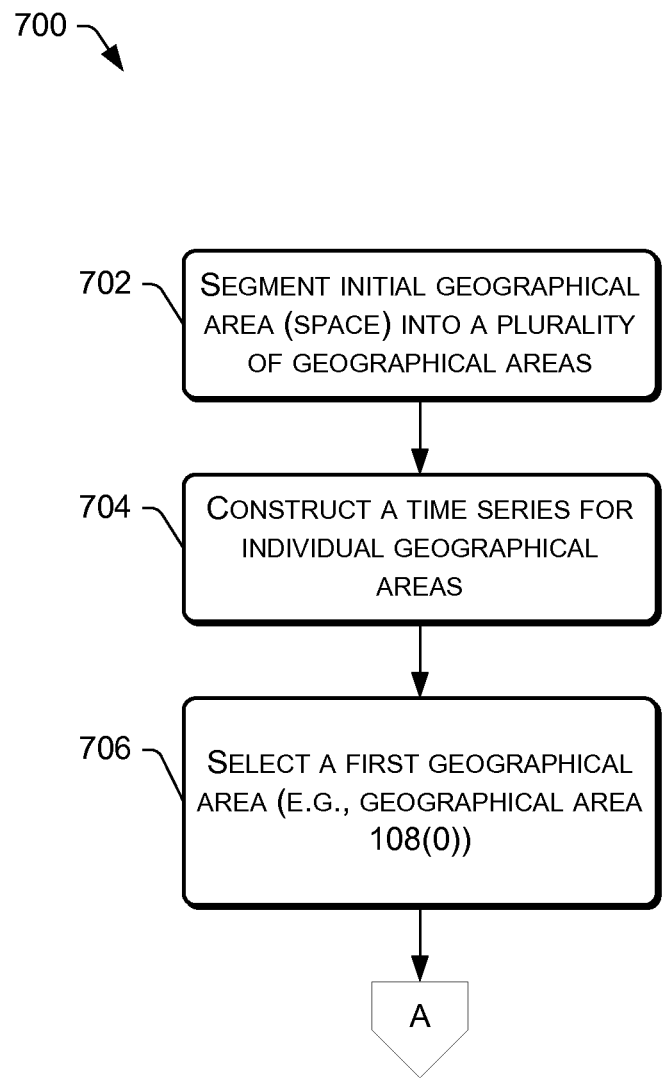
FIG. 7 is a flow diagram of an example process of discretizing a geographical area and selecting a geographical area in which an anomaly is to be detected.

FIG. 7 is a flow diagram of an example process 700 of discretizing a geographical area and selecting a geographical area in which an anomaly is to be detected. The process 700 is described with reference to the previous Figures. Particular reference may be made to the discretizer 324 of FIG. 3. Furthermore, the process 700 may precede step 114 of the process 102 in order to select the geographical area 108(0) under evaluation in the process 102, as indicated by the off-page reference "A" in FIGS. 1 and 7.

At 702, an initial geographical area, such as the area represented by the map 110 in FIGS. 1, 2, and 4, may be segmented (or discretized) by the discretizer 324 into a plurality of geographical areas, as described herein. In some embodiments, the initial geographical area is discretized into a triangular tessellation (e.g., as shown in FIG. 4) such that each geographical area of the plurality of geographical areas is triangular, and the plurality of geographical areas are substantially uniform in size, with no overlaps or gaps there between. Although discretization of a geographical area (or "space") is contemplated herein, it is to be appreciated that the process 700 may be extended to other "spaces" that are not geographic, as will be described in more detail below.

At 704, the time series module 326 may construct a time series of actual values for individual ones of the geographical areas 108 that make up the discretization from 702. For example, a first time series of actual values may be constructed for a first geographical area 108(0), and second time series of actual values may be constructed for a second geographical area 108(1), such as a geographical area that neighbors the first geographical area 108(0), and so on for additional ones of the plurality of geographical areas 108 produced at 702. As described herein, a time series comprises a plurality of data points plotted over time, each data point representing a value of a measurement taken during a time interval (e.g., the partial time series 600 shown in FIG. 6). In some embodiments the construction of a time series at 704 may involve the discretizer 324 discretizing time by at least one time interval, $\Delta T$.

At 706, the anomaly detector 336 may select one of the plurality of geographical areas 108 to evaluate for an anomaly therein. For example, the first geographical area 108(0) (shown in FIG. 1) may be selected at 706 and evaluated using the process 102. For example, a time series of expected values 602 may be inferred for the geographical area 108(0) selected at 706, which may be compared to a time series of actual values for the geographical area 108(0) to determine a time series of prediction errors 604. The process 102 may thus be utilized after the process 700 to determine that an anomaly has occurred in the geographical area 108(0) based at least in part on a prediction error 604 that is found to be anomalous. Accordingly, the process 700 may proceed to 114 of the process 102 in FIG. 1 to detect anomalies using the machine-learned inference function 332.

Figure 8:
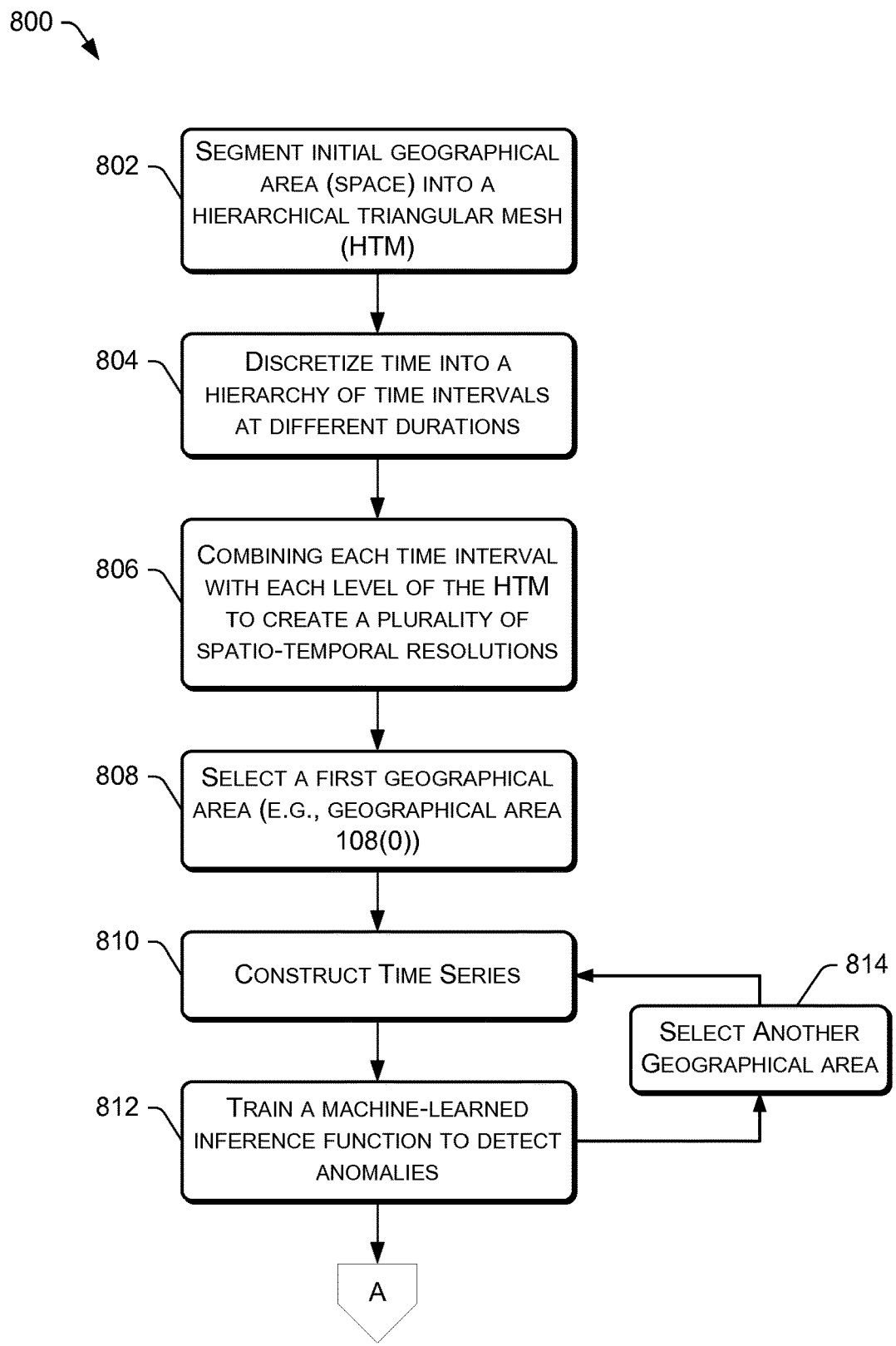
FIG. 8 is a flow diagram of an example process of discretizing space and time into respective hierarchies of discretizations and combining space and time discretizations to create spatio-temporal discretizations.

FIG. 8 is a flow diagram of an example process 800 of discretizing space and time into respective hierarchies of discretizations and combining space and time discretizations to create spatio-temporal discretizations. The process 800 is described with reference to the previous Figures. Particular reference may be made to the discretizer 324 of FIG. 3. Furthermore, the process 800 may precede step 114 of the process 102 in order to create the geographical area 108(0) under evaluation in the process 102 at a discretized time interval, as indicated by the off-page reference "A" in FIGS. 1 and 8.

At 802, an initial geographical area, such as the area represented by the map 110 in FIG. 4, may be segmented (or discretized) by the discretizer 324 into a HTM 400, as described herein. The HTM 400 resulting from 802 may comprise a plurality of triangular tessellations at different levels of resolution, such as the different resolution levels shown in FIG. 4 and described herein.

At 804, the discretizer 324 may discretize time by creating a hierarchy of time intervals at different durations, as described herein. For example, the time discretization at 804 may involve discretization of time as follows: $\Delta T \in \{20 \text{ min}, 1 \text{ hr}, 3 \text{ hr}, 6 \text{ hr}, 12 \text{ hr}, 24 \text{ hr}\}$. In some embodiments, the time discretization at 804 may include discretizing time into two sets of time discretizations shown in FIG. 5, which are offset from each other by $\Delta T/2$ in an effort to detect local anomalies (and corresponding events) starting near even or odd multiples of $\Delta T/2$.

At 806, the discretizer 324 may combine each time interval of the hierarchy of time intervals with each level of the different levels of resolution to create a plurality of spatio-temporal resolutions, or 3D prisms, as described herein.

At 808, one of the plurality of geographical areas 108 at a particular level of spatial resolution in the HTM 400 and at a particular time discretization (i.e., time interval) may be selected. For example, the first geographical area 108(0) (shown in FIG. 1) may be selected at 808.

At 810, the time series module 326 may construct a time series of actual values for the geographical area 108(0) selected at 808. At 812, the machine learning training module 330 may train a machine-learned inference function 332 for detecting anomalies, as described herein.

The process 800 may iterate by proceeding to 814 where another geographical area, such as the geographical area 108(1), may be selected at a particular spatio-temporal resolution so that it may have a time series constructed at 810 and an inference function 332 trained. The loop from 812 to 814 to 810 may iterate until inference functions 332 have been trained for all of the geographical areas 108 (e.g., triangles) in the HTM 400 at all of the spatio-temporal combinations. The process 800 may allow for varying the spatial and temporal resolution of a time series so that the anomaly detection system 308 can detect local events at different scales of space and time. Thus, the process 800 may proceed to 114 of the process 102 in FIG. 1 to detect anomalies using the machine-learned inference function 332.

In some embodiments, before a geographical area 108 of the HTM 400 is analyzed with the process 102 (i.e., before executing its inference function 332 for detecting anomalies), the optimizer 338 may be utilized to determine if a qualifying condition is met, as described herein, so as to proceed through the process 102 if it makes sense to do so (i.e., if the qualifying condition is met), and refraining from executing the process 102 otherwise, or until the qualifying condition is met, as described herein.

Figure 9:
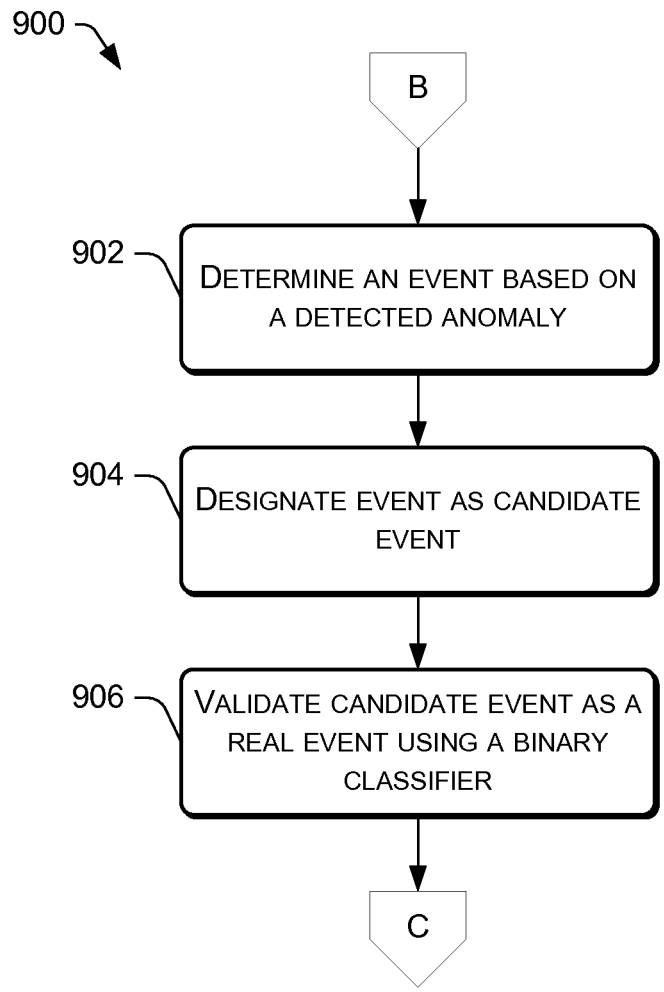
FIG. 9 is a flow diagram of an example process of determining an event from a detected anomaly using a binary classifier.

FIG. 9 is a flow diagram of an example process 900 of determining an event from a detected anomaly using a binary classifier 334. The process 900 is described with reference to the previous Figures. Particular reference may be made to the binary classifier 334 of FIG. 3. Furthermore, the process 900 may continue from 118 of the process 102 in FIG. 1 in order to utilize a detected anomaly for determining an event, as indicated by the off-page reference "B" in FIGS. 1 and 9.

At 902, an event may be determined based on a detected anomaly, such as an anomaly detected by the process 102 of FIG. 1. For example, an anomaly detection may trigger a text summarizer 340 to process text contained in the data (e.g., microblog posts) for purposes of summarizing (creating a text summary of) an event that is suspected to correspond to the detected anomaly. In some embodiments a text summary may include an extracted sample of microblog posts centered around the detected anomaly in space and time.

At 904, the event determined at 902 may be designated as a candidate local event for the geographical area 108 in question. In some embodiments, the event determined at 902 can be directly output as an event for consumption without further validation, but the validation at 904 and 906 improve the precision of the anomaly detection system 308.

At 906, the machine-learned binary classifier 334 may validate the candidate event by determining whether the candidate event is a real event or something that is based on a random anomaly that is not correlated with a local event. In some embodiments, the output of 906 may be a probability that is indicative of the likelihood that the candidate local event is actually a local event. To output this probability, the binary classifier 334 may be trained on various features as input to the binary classifier 334. One of those features may be a feature that is based on the output of the inference function 332 (e.g., the prediction error 604 of FIG. 6). In this manner, the binary classifier 332 can learn how to determine real events from the candidate events.

Figure 10:
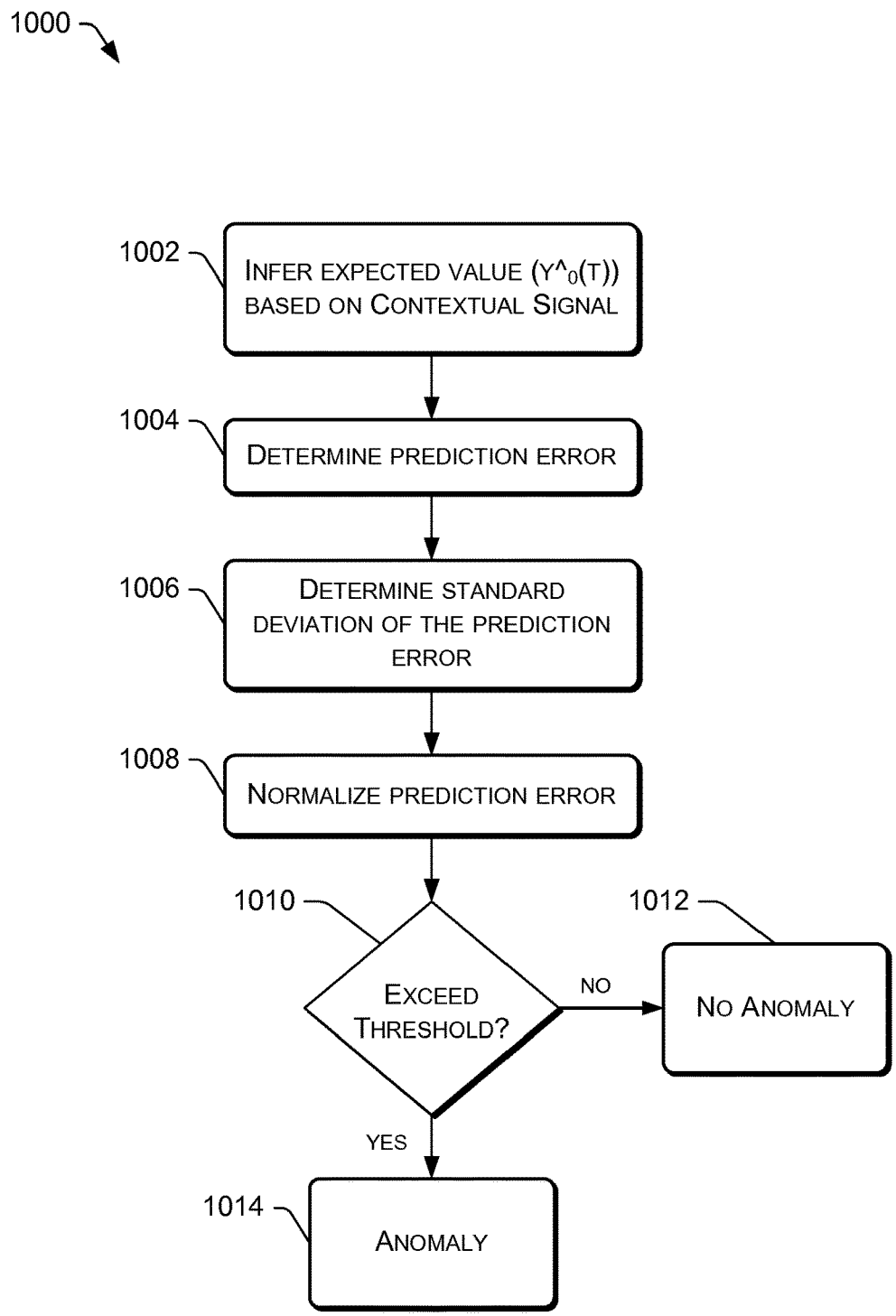
FIG. 10 is a flow diagram of an example process of detecting an anomaly using a normalized prediction error.

FIG. 10 is a flow diagram of an example process 1000 of detecting an anomaly using a normalized prediction error. The process 1000 is described with reference to the previous Figures. Particular reference may be made to the anomaly detector 336 of FIG. 3. Furthermore, the process 1000 may represent a more detailed sub-process of the process 102 in FIG. 1.

At 1002, the inference function 332 may be used by the anomaly detector 336 to infer an expected value, $\hat{y}_0(t)$, for the geographical area 108(0) as a function of at least one contextual signal, as described herein. Step 1002 may be the same as, or similar to, step 114 of the process 102 in FIG. 1.

At 1004, a prediction error may be determined by comparing the expected value to an actual value for the geographical area 108(0). For example, the prediction error at time t may be calculated as $e_t = \hat{y}_t - y_t$. Step 1004 may be the same as, or similar to, step 116 of the process 102.

At 1006, a standard deviation, denoted $s_t$, of the prediction error, $e_t$, may be determined. The standard deviation calculated at 1006 measures the precision of the inference function 332 that the prediction error, $e_t$, is based on. As noted above, the overall precision of the inference function 332 varies from geographical area 108 to geographical area 108.

To account for this variation, the process 1000 may proceed to 1008 where the prediction error, $e_t$, may be normalized. An example normalization technique is to divide the prediction error, $e_t$, by the standard deviation, $s_t$, i.e. $e_t/s_t$. FIG. 6 illustrates the normalized error 606.

At 1010, the normalized error 606 may be compared to a predetermined threshold error (e.g., −3.0). If the normalized error 606 does not exceeds the threshold at 1010, the anomaly detector 336 determines that there is no anomaly in the data at 1012. If the normalized error 606 exceeds the threshold at 1010, the anomaly detector 336 determines that an anomaly has occurred in the geographical area 108 of interest. In this scenario, the normalized prediction error 606 and the predetermined threshold may be negative values because often the prediction error 604 is a negative value (since an anomaly often involves the actual value of the partial time series 600 exceeding the expected value 602). In this sense, determining whether the predetermined threshold is exceeded at 1010 may comprise determining that the absolute value of the normalized error 606 is greater than the absolute value of the predetermined threshold. Normalizing the prediction error 604 by the standard deviation (to obtain the normalized error 606 in the process 1000) allows for applying a single threshold to all geographical areas 108 while still accounting for the variation in the inference function's 332 prediction error 604 from location to location.

Figure 11:
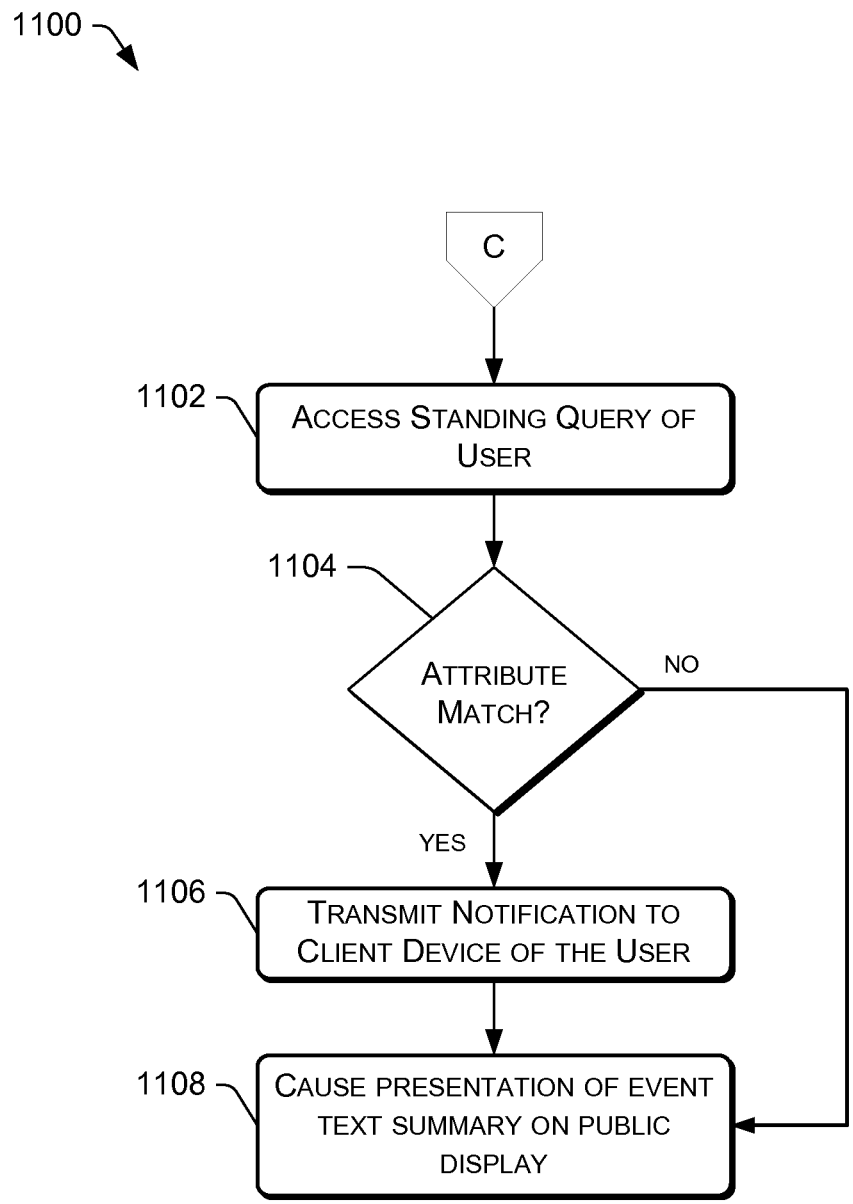
FIG. 11 is a flow diagram of an example process of notifying users of a local event.

FIG. 11 is a flow diagram of an example process 1100 of notifying users 302 of a local event detected by the anomaly detection system 308. The process 1100 is described with reference to the previous Figures. Particular reference may be made to the user interface manager 316 of FIG. 3. Furthermore, the process 1100 may continue from 906 of the process 900 in order to output a detected local event to client devices 304 of the users 302, as indicated by the off-page reference "C" in FIGS. 9 and 11.

At 1102, the system 308 may access a standing query that has been submitted by a user 302 for purposes of receiving notifications of local events based on the standing query. A standing query may be specified by a user 302 and stored in a user profile for the user 302. The anomaly detection system 308 may allow the user 302 to specify a standing query in terms of event "topics" that the user 302 would like to be alerted to. For example, the user 302 may specify, in a standing query, that he/she would like to be alerted to traffic jams. The user 302 may also specify, or subscribe to, one or more locations and/or geographical areas for the anomaly detection system 308 to look for events and notify the user 302 of events occur at those locations or within those specified areas. For example, the user 302 may specify that he/she would like to be notified of events that are detected within a particular radius of his/her home, work, and/or vacation location. In some embodiments, the user interface manager 316 may allow the user 302 to specify one or more routes as part of a standing query, such as a route between home and work locations, where the anomaly detection system 308 is to look for events. Thus, the anomaly detection system 308 can actively "listen" for events in those regions and alert the user 302 if any are detected. The user interface manager 316 may allow the user to specify times and/or time ranges/windows for the standing query, such as "I want to be alerted of events that are detected within the hours of 7:00 AM to 9:00 AM and 3:00 PM to 5:00 PM."

At 1104, attributes of a detected event may be compared to the standing query accessed at 1102 for the particular user 302. For example, a detected event may have various attributes, such as time (when the event was detected), space (where the event was detected in terms of location and/or geographical area 108), topic (e.g., sports, weather, traffic, natural disaster, etc.), and so on. These attributes may be compared to the standing query of the user 302 to determine if there is a match.

If an attribute of the event matches the standing query at 1104, the process 1100 may proceed to 1106 where a notification of the event is transmitted to a client device(s) 304 of the user 302. The transmission of a notification to the client device 304 may be in any suitable form, such as a push notification, an email, an SMS text, a pop-up window in a mobile application, and so on. Thus, the user 302 can be notified on an associated client device 304 of an event that was detected and that matches a standing query specified by the user 302.

Regardless of whether or not a notification is sent to the user 302 at 1106, the detected event, which may be of interest to the general public, may be presented on a public display at 1108. The anomaly detection system 308 may have knowledge (e.g., addresses, locations, etc.) of various public displays that are situated in public venues/environments (e.g., a billboard display on a highway, a display in a shopping mall, a display in an airport, etc.). The public display on which the text summary of the event is displayed at 1108 may be selected based on the location of the event. For example, a local event detected in Seattle, Wash. may be presented on displays located in and around Seattle.

In some embodiments, the anomaly detection system 308 may display a plurality of events on a client device 304 and/or a public display according to the process 1100. In this scenario, the events may be ranked to show the "top 10" events at a given time and/or on a given day. For example, the probabilities output by the binary classifier 334 for the detected events may be used to sort or rank the events. As another example, the actual value (e.g., the number of microblog posts) that were detected to be at an anomalous level by the process 102 may be used to rank the events. This is especially useful in the case where the same data (e.g., microblog posts) is used for detecting two or more different events that can be ranked relative to each other.

Many of the examples herein are described in terms of using geographical area as the context 108, but the techniques are not so limited, and other contexts 108 may be used instead of geographical area. Geographical context allows for describing adjacencies and distances between any two locations or geographical areas. However, other contexts 108 may have similar distance and adjacency characteristics.

For example, another type of context 108 may be "language". In this example, microblog posts may be categorized into different language, where one time series $y_0(t)$ may represent microblog posts in a first language 108(0) (e.g., English), and another time series $y_1(t)$ may represent microblog posts in a second language 108(1), and so on for additional languages up to $y_N(t)$. Distances between different languages may be based on notions of language families (e.g., Romance languages, Bantu languages, etc.). Two very similar languages (e.g., Spanish and Italian) may have a relatively shorter distance between then than say, English and Swahili, which are two very different languages based on origins of those languages and definitions of language families. Accordingly, the techniques described herein may be used with language context 108 to detect anomalies localized to a first language (e.g., English). For example, the actual number of Spanish-language microblog posts may be used in the inference function 112 to infer an expected number of English-language microblog posts, if there is a correlation between numbers of Spanish and English microblog posts.

Another example type of context 108 is "age range" associated with users 302 that created the data, such as microblog posts. In this example, different age range groupings (e.g., age 15-20, age 20-25, etc.) can be defined, and distances between them can be based on the numerical values of those ranges. For example, the age range of 15-20 year olds is adjacent to the age range of 20-25 year olds, and is therefore closer in distance to that age group than it is to the age range of 40-45 year olds. Thus, the techniques described herein may be used with "age" context 108 to detect anomalies localized to a first age range/group (e.g., 20-25 year olds). For example, the actual number of microblog posts from 30-35 year olds may be used in the inference function 112 to infer an expected number of microblog posts from 20-25 year olds, if there is a correlation between numbers of microblog posts from those two age groups.

Another type of context 108 are users 302 themselves. Access to social network graphs (e.g., Facebook®) allows for establishing distances between any two users 302 based on degree of connectedness or separation in the social graph. For example, two close friends with many common friends may be treated as having an adjacent relationship with a relatively short distance between them, whereas two complete strangers with very few commonalities may be treated as having a relatively large distance between them by virtue of the social graph information. Thus, the techniques described herein may be used with "user" context 108 to detect anomalies localized to a first user 302. For example, the actual number of microblog posts from a second user 302 may be used in the inference function 112 to infer an expected number of microblog posts from a first user 302, if there is a correlation between numbers of microblog posts from those two users 302.

As noted above, it is to be appreciated that the measured value that is used to detect an anomaly for a particular context may relate to any occurrence, activity, or factor that can be measured, and is not limited to a value that represents a number of microblog posts.

For example, the measured value may be a number of items (e.g., products, goods, services, etc.) sold in different contexts 108 (e.g., geographical areas). Therefore, the techniques described herein may be implemented for detecting anomalies in volume of bologna sales, for example. In this example, the inference function 112 may infer an expected sales volume of bologna in a first geographical area 108 based on the sales volume of bologna in a neighboring geographical area 108, and the expected sales volume of bologna in the first geographical area 108 may be used to detect an anomalous spike in bologna sales in the first geographical area 108. Alternatively, the inference function 204 may infer an expected sales volume of bologna based on an actual sales volume of bread in the same geographical area 108, or a different geographical area 108.

Because microblog posts are used throughout the disclosure as an example of the data on which the value can be measured, some additional detail regarding the use of microblog posts is now described. A microblog service (e.g., Twitter®) provides unprecedented access to accounts of local events from people at the scene of the event. Eyewitnesses (e.g., users 302) with connected devices (e.g., client devices 304) can report on local events before any traditional news outlet could discover, interpret, and broadcast. Microblog readers and posters recognize the value of a microblog service for providing access to information on local events as they break.

Mainstream microblog services, such as Twitter®, are estimated to receive upwards of 500 million microblog posts per day. With so many posts, it can be difficult to extract and cluster only those pertaining to a local event. Furthermore, microblog posts from different locations may be about local or non-local topics. Typically, local events in microblog data are documented by multiple people, such as the multiple microblog posts about an anomalous traffic jam in northern Florida. The time stamps, location data, and text of the microblog posts give the basic facts, but the text also gives a rich account of the event in terms of emotions, meaning, and consequences. However, spikes in the rate of microblog posts over limited spans of time and space are often associated with a local event. The assumption is that significant local events are characterized by many people suddenly creating microblog posts in a limited region for a limited time period.

The techniques and systems disclosed herein may be utilized to detect anomalous numbers of microblog posts (an example of the actual value of y(t)) in particular geographic areas over discrete time intervals. Although geotags are one way of determining a location where a microblog post was made, not all microblog posts are geotagged. Accordingly, the anomaly detection system 308 may deduce locations of microblog posts in other ways, such as by a geolocation device of the client device 304 used to make the microblog post, such as a Global Positioning System (GPS) receiver, or a similar geolocation sensor. The Internet Protocol (IP) address of a situated client device 304 may also provide location data. However, despite the fact that not all microblog posts are geotagged, the techniques and systems described herein work even when exclusively looking at geotagged microblog posts and excluding from consideration microblog posts that are not geotagged.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example One

A computer-implemented method (e.g., performing operations by executing computer-executable instructions stored in memory using one or more processors) comprising: inferring an expected value (e.g., an expected number of microblog posts, an expected number of bald eagle sightings, etc.) for a first context (e.g., a first geographical area, a first language, a first age group, etc.) based at least in part on a first actual value that is: (i) of a same type as the expected value, and (ii) associated with a second context that is different from the first context; determining a prediction error by comparing the expected value to a second actual value that is: (i) of the same type as the expected value, and (ii) associated with the first context; and determining that an anomaly has occurred in the first context based at least in part on the prediction error.

Example Two

The method of Example One, further comprising training a machine-learned inference function (e.g., a regression function) to infer the expected value for the first context as a function of at least the first actual value, wherein inferring the expected value comprises utilizing the machine-learned inference function.

Example Three

The method of any of the previous examples, alone or in combination, further comprising determining a standard deviation of the prediction error; normalizing the prediction error by dividing the prediction error by the standard deviation to obtain a normalized prediction error; and comparing the normalized prediction error to a predetermined threshold, wherein determining that the anomaly has occurred in the first context comprises determining that the normalized prediction error exceeds the predetermined threshold.

Example Four

The method of any of the previous examples, alone or in combination, wherein the first context comprises a first geographical area and the second context comprises a second geographical area that is within a predetermined distance from the first geographical area, the method further comprising determining an event in the first geographical area based at least in part on the anomaly.

Example Five

The method of any of the previous examples, alone or in combination, further comprising designating the event as a candidate event; and determining that the candidate event is a real event using a machine-learned binary classifier.

Example Six

The method of any of the previous examples, alone or in combination, further comprising accessing a standing query (e.g., a standing query specifying a geographic location, a time range, and/or a topic, etc.) associated with a user; determining that attributes (e.g., geographic location/area, time, topic, etc.) of the real event satisfy the standing query; and transmitting a notification of the real event to a client device associated with the user.

Example Seven

The method of any of the previous examples, alone or in combination, further comprising creating a text summary (e.g., a set of microblog posts) of the real event; and causing presentation of the text summary on a public display situated in a public space within the first geographical area.

Example Eight

The method of any of the previous examples, alone or in combination, wherein the first context comprises a first geographical area and the second context comprises a second geographical area, the method further comprising: discretizing an initial geographical area into a plurality of geographical areas, the plurality of geographical areas including the first geographical area and the second geographical area; for each geographical area of the plurality of geographical areas constructing a time series comprising a plurality of data points plotted over time, each data point representing an actual value of a measurement (e.g., a measured number of microblog posts) taken during a time interval; and for the first geographical area, inferring a plurality of expected values, including the expected value, for each data point in the time series.

Example Nine

The method of any of the previous examples, alone or in combination, wherein the initial geographical area is discretized into a triangular tessellation such that each geographical area of the plurality of geographical areas is triangular, and the plurality of geographical areas are substantially uniform in size.

Example Ten

The method of any of the previous examples, alone or in combination, wherein discretizing the initial geographical area comprises creating a hierarchical triangular mesh (HTM) comprising multiple triangular tessellations at different levels of resolution, the method further comprising: discretizing time by creating a hierarchy of time intervals at different durations, the hierarchy of time intervals including the time interval; combining each time interval of the hierarchy of time intervals with each level of the different levels of resolution to create a plurality of spatio-temporal resolutions; selecting the first geographical area at a spatio-temporal resolution of the plurality of spatio-temporal resolutions; and for the first geographical area: constructing a time series; training a machine-learned inference function for detecting anomalies; and determining that a qualifying condition is met by analyzing the time series to determine that actual values of the time series meet or exceed a threshold.

Example Eleven

A computer-implemented method (e.g., performing operations by executing computer-executable instructions stored in memory using one or more processors) comprising: inferring an expected value (an expected number of microblog posts, an expected number of bald eagle sightings, etc.) for a first context (e.g., a first geographical area, a first language, a first age group, etc.) based at least in part on a first actual value that is: (i) of a different type than a type of the expected value, and (ii) associated with the first context, or a second context that is different from the first context; determining a prediction error by comparing the expected value to a second actual value that is: (i) of a same type as the expected value, and (ii) associated with the first context; and determining that an anomaly has occurred in the first context based at least in part on the prediction error.

Example Twelve

The method of Example Eleven, further comprising training a machine-learned inference function (e.g., a regression function) to infer the expected value for the first context as a function of at least the first actual value, wherein inferring the expected value comprises utilizing the machine-learned inference function.

Example Thirteen

The method of any of the previous examples, alone or in combination, further comprising comparing the prediction error to a predetermined threshold, wherein determining that the anomaly has occurred in the first context comprises determining that the prediction error exceeds the predetermined threshold.

Example Fourteen

The method of any of the previous examples, alone or in combination, wherein the first context comprises a first geographical area and the second context comprises a second geographical area that is adjacent to the first geographical area, the method further comprising determining an event in the first geographical area based at least in part on the anomaly.

Example Fifteen

The method of any of the previous examples, alone or in combination, further comprising designating the event as a candidate event; and determining that the candidate event is a real event using a machine-learned binary classifier.

Example Sixteen

A system comprising: memory (e.g., RAM, ROM, EEPROM, flash memory, etc.); one or more processors (e.g., central processing units (CPUs), system on chip (SoC), etc.); one or more modules stored in the memory and executable by the one or more processors to perform operations comprising: inferring a time series of expected values (e.g., a time series of expected numbers of microblog posts) for a first geographical area based at least in part on a first time series of actual values for a second geographical area; determining a time series of prediction errors by comparing the time series of expected values to a second time series of actual values for the first geographical area; and determining that an anomaly has occurred in the first geographical area based at least in part on the time series of prediction errors.

Example Seventeen

The system of Example Sixteen, the operations further comprising, prior to inferring the time series of expected values: segmenting an initial geographical area into a plurality of geographical areas, wherein the plurality of geographical areas includes the first geographical area and the second geographical area; constructing the first time series of actual values for the second geographical area; constructing the second time series of actual values for the first geographical area; and selecting the first geographical area to analyze for the anomaly.

Example Eighteen

The system of any of the previous examples, alone or in combination, the operations further comprising training a machine-learned inference function (e.g., a regression function) to infer the time series of expected values for the first geographical area as a function of: a time of day, a day of week, and at least the first time series of actual values, wherein inferring the time series of expected values comprises utilizing the machine-learned inference function.

Example Nineteen

The system of any of the previous examples, alone or in combination, the operations further comprising determining an event in the first geographical area based at least in part on the anomaly.

Example Twenty

The system of any of the previous examples, alone or in combination, the operations further comprising: designating the event as a candidate event; and determining that the candidate event is a real event using a machine-learned binary classifier.

Example Twenty-One

A computer-readable storage medium comprising a memory storing programming instructions that are executable by one or more processors to cause performance of operations comprising: inferring an expected value (e.g., an expected number of microblog posts, an expected number of bald eagle sightings, etc.) for a first context (e.g., a first geographical area, a first language, a first age group, etc.) based at least in part on a first actual value that is: (i) of a same type as the expected value, and (ii) associated with a second context that is different from the first context; determining a prediction error by comparing the expected value to a second actual value that is: (i) of the same type as the expected value, and (ii) associated with the first context; and determining that an anomaly has occurred in the first context based at least in part on the prediction error.

Example Twenty-Two

The computer-readable storage medium of Example Twenty-One, the operations further comprising training a machine-learned inference function (e.g., a regression function) to infer the expected value for the first context as a function of at least the first actual value, wherein inferring the expected value comprises utilizing the machine-learned inference function.

Example Twenty-Three

The computer-readable storage medium of any of the previous examples, alone or in combination, the operations further comprising determining a standard deviation of the prediction error; normalizing the prediction error by dividing the prediction error by the standard deviation to obtain a normalized prediction error; and comparing the normalized prediction error to a predetermined threshold, wherein determining that the anomaly has occurred in the first context comprises determining that the normalized prediction error exceeds the predetermined threshold.

Example Twenty-Four

The computer-readable storage medium of any of the previous examples, alone or in combination, wherein the first context comprises a first geographical area and the second context comprises a second geographical area that is within a predetermined distance from the first geographical area, the operations further comprising determining an event in the first geographical area based at least in part on the anomaly.

Example Twenty-Five

The computer-readable storage medium of any of the previous examples, alone or in combination, the operations further comprising designating the event as a candidate event; and determining that the candidate event is a real event using a machine-learned binary classifier.

Example Twenty-Six

The computer-readable storage medium of any of the previous examples, alone or in combination, the operations further comprising accessing a standing query (e.g., a standing query specifying a geographic location, a time range, and/or a topic, etc.) associated with a user; determining that attributes (e.g., geographic location/area, time, topic, etc.) of the real event satisfy the standing query; and transmitting a notification of the real event to a client device associated with the user.

Example Twenty-Seven

The computer-readable storage medium of any of the previous examples, alone or in combination, the operations further comprising creating a text summary (e.g., a set of microblog posts) of the real event; and causing presentation of the text summary on a public display situated in a public space within the first geographical area.

Example Twenty-Eight

The computer-readable storage medium of any of the previous examples, alone or in combination, the operations further comprising wherein the first context comprises a first geographical area and the second context comprises a second geographical area, the operations further comprising: discretizing an initial geographical area into a plurality of geographical areas, the plurality of geographical areas including the first geographical area and the second geographical area; for each geographical area of the plurality of geographical areas constructing a time series comprising a plurality of data points plotted over time, each data point representing an actual value of a measurement (e.g., a measured number of microblog posts) taken during a time interval; and for the first geographical area, inferring a plurality of expected values, including the expected value, for each data point in the time series.

Example Twenty-Nine

The computer-readable storage medium of any of the previous examples, alone or in combination, the operations further comprising wherein the initial geographical area is discretized into a triangular tessellation such that each geographical area of the plurality of geographical areas is triangular, and the plurality of geographical areas are substantially uniform in size.

Example Thirty

The computer-readable storage medium of any of the previous examples, alone or in combination, wherein discretizing the initial geographical area comprises creating a hierarchical triangular mesh (HTM) comprising multiple triangular tessellations at different levels of resolution, the operations further comprising: discretizing time by creating a hierarchy of time intervals at different durations, the hierarchy of time intervals including the time interval; combining each time interval of the hierarchy of time intervals with each level of the different levels of resolution to create a plurality of spatio-temporal resolutions; selecting the first geographical area at a spatio-temporal resolution of the plurality of spatio-temporal resolutions; and for the first geographical area: constructing a time series; training a machine-learned inference function for detecting anomalies; and determining that a qualifying condition is met by analyzing the time series to determine that actual values of the time series meet or exceed a threshold.

Example Thirty-One

A computer-readable storage medium comprising a memory storing programming instructions that are executable by one or more processors to cause performance of operations comprising: inferring an expected value (an expected number of microblog posts, an expected number of bald eagle sightings, etc.) for a first context (e.g., a first geographical area, a first language, a first age group, etc.) based at least in part on a first actual value that is: (i) of a different type than a type of the expected value, and (ii) associated with the first context, or a second context that is different from the first context; determining a prediction error by comparing the expected value to a second actual value that is: (i) of a same type as the expected value, and (ii) associated with the first context; and determining that an anomaly has occurred in the first context based at least in part on the prediction error.

Example Thirty-Two

The computer-readable storage medium of Example Thirty-One, the operations further comprising training a machine-learned inference function (e.g., a regression function) to infer the expected value for the first context as a function of at least the first actual value, wherein inferring the expected value comprises utilizing the machine-learned inference function.

Example Thirty-Three

The computer-readable storage medium of any of the previous examples, alone or in combination, the operations further comprising comparing the prediction error to a predetermined threshold, wherein determining that the anomaly has occurred in the first context comprises determining that the prediction error exceeds the predetermined threshold.

Example Thirty-Four

The computer-readable storage medium of any of the previous examples, alone or in combination, wherein the first context comprises a first geographical area and the second context comprises a second geographical area that is adjacent to the first geographical area, the operations further comprising determining an event in the first geographical area based at least in part on the anomaly.

Example Thirty-Five

The computer-readable storage medium of any of the previous examples, alone or in combination, the operations further comprising designating the event as a candidate event; and determining that the candidate event is a real event using a machine-learned binary classifier.

Example Thirty-Six

A computer-readable storage medium comprising a memory storing programming instructions that are executable by one or more processors to cause performance of operations comprising: inferring a time series of expected values (e.g., a time series of expected numbers of microblog posts) for a first geographical area based at least in part on a first time series of actual values for a second geographical area; determining a time series of prediction errors by comparing the time series of expected values to a second time series of actual values for the first geographical area; and determining that an anomaly has occurred in the first geographical area based at least in part on the time series of prediction errors.

Example Thirty-Seven

The computer-readable storage medium of Example Thirty-Six, the operations further comprising, prior to inferring the time series of expected values: segmenting an initial geographical area into a plurality of geographical areas, wherein the plurality of geographical areas includes the first geographical area and the second geographical area; constructing the first time series of actual values for the second geographical area; constructing the second time series of actual values for the first geographical area; and selecting the first geographical area to analyze for the anomaly.

Example Thirty-Eight

The computer-readable storage medium of any of the previous examples, alone or in combination, the operations further comprising training a machine-learned inference function (e.g., a regression function) to infer the time series of expected values for the first geographical area as a function of: a time of day, a day of week, and at least the first time series of actual values, wherein inferring the time series of expected values comprises utilizing the machine-learned inference function.

Example Thirty-Nine

The computer-readable storage medium of any of the previous examples, alone or in combination, the operations further comprising determining an event in the first geographical area based at least in part on the anomaly.

Example Forty

The computer-readable storage medium of any of the previous examples, alone or in combination, the operations further comprising: designating the event as a candidate event; and determining that the candidate event is a real event using a machine-learned binary classifier.

Example Forty-One

A system comprising: means for executing computer-executable instructions (e.g., processors, including, for example, hardware processors such as central processing units (CPUs), system on chip (SoC), etc.); and means for storing computer-executable instructions (e.g., memory, computer readable storage media such as RAM, ROM, EEPROM, flash memory, etc.) including: means for inferring a time series of expected values (e.g., a time series of expected numbers of microblog posts) for a first geographical area based at least in part on a first time series of actual values for a second geographical area; means for determining a time series of prediction errors by comparing the time series of expected values to a second time series of actual values for the first geographical area; and means for determining that an anomaly has occurred in the first geographical area based at least in part on the time series of prediction errors.

Example Forty-Two

A computer-implemented method (e.g., performing operations by executing computer-executable instructions stored in memory using one or more processors) comprising: segmenting an initial geographical area into a plurality of geographical areas; selecting a first geographical area of the plurality of geographical areas; for the first geographical area: constructing a time series comprising a plurality of data points plotted over time, each data point representing an actual value of a measurement taken during a time interval; training a machine-learned inference function for detecting anomalies; determining that a qualifying condition is met by analyzing the time series to determine that actual values of the time series meet or exceed a threshold; inferring, using the machine-learned inference function, an expected value for the first geographical area based at least in part on a first actual value that is: (i) of a same type as the expected value, and (ii) associated with a second geographical area of the plurality of geographical areas; determining a prediction error by comparing the expected value to a second actual value of the time series that is of the same type as the expected value; and determining that an anomaly has occurred in the first geographical area based at least in part on the prediction error.

Example Forty-Three

A computer-implemented method (e.g., performing operations by executing computer-executable instructions stored in memory using one or more processors) comprising: segmenting an initial geographical area into a plurality of geographical areas; selecting a first geographical area of the plurality of geographical areas; for the first geographical area: constructing a time series comprising a plurality of data points plotted over time, each data point representing an actual value of a measurement taken during a time interval; training a machine-learned inference function for detecting anomalies; determining that a qualifying condition is met by analyzing the time series to determine that actual values of the time series meet or exceed a threshold; inferring an expected value for the first geographical area based at least in part on a first actual value that is: (i) of a different type than a type of the expected value, and (ii) associated with the first geographical area, or a second geographical area of the plurality of geographical areas; determining a prediction error by comparing the expected value to a second actual value of the time series that is of a same type as the expected value; and determining that an anomaly has occurred in the first context based at least in part on the prediction error.

Example Forty-Four

A computer-implemented method (e.g., performing operations by executing computer-executable instructions stored in memory using one or more processors) comprising: segmenting an initial geographical area into a plurality of geographical areas; obtaining, from a data source, actual values of a measurement that are associated with the initial geographical area and are taken over a period of time; selecting a subset of the plurality of geographical areas that cumulatively contain a predetermined percentage of a total number of the actual values measured over the period of time; selecting, from the subset, a first geographical area of the plurality of geographical areas; and for the first geographical area: inferring an expected value for the first geographical area based at least in part on a first actual value that is: (i) of a same type as the expected value, and (ii) associated with a second geographical area of the subset; determining a prediction error by comparing the expected value to a second actual value that is: (i) of the same type as the expected value, and (ii) associated with the first geographical area; and determining that an anomaly has occurred in the first context based at least in part on the prediction error.

Example Forty-Five

A computer-implemented method (e.g., performing operations by executing computer-executable instructions stored in memory using one or more processors) comprising: segmenting an initial geographical area into a plurality of geographical areas; obtaining, from a data source, actual values of a measurement that are associated with the initial geographical area and are taken over a period of time; selecting a subset of the plurality of geographical areas that cumulatively contain a predetermined percentage of a total number of the actual values measured over the period of time; selecting, from the subset, a first geographical area of the plurality of geographical areas; and for the first geographical area: inferring an expected value for the first geographical area based at least in part on a first actual value that is: (i) of a different type than a type of the expected value, and (ii) associated with the first geographical area, or a second geographical area that is different from the first context; determining a prediction error by comparing the expected value to a second actual value that is: (i) of a same type as the expected value, and (ii) associated with the first geographical area; and determining that an anomaly has occurred in the first context based at least in part on the prediction error.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method comprising:
    collecting a first time series of data points representing actual values for a first geographical area, and a second time series of data points representing actual values for a second geographical area that is different from the first geographical area, the actual values of the first time series and the actual values of the second time series being of a same type;
    utilizing a machine-learned inference function to infer a third time series of data points representing expected values of the same type as the actual values of the first and second time series, the expected values being for the first geographical area;
    determining a fourth time series of data points representing prediction errors for the first geographical area; and
    determining that an anomaly has occurred in the first geographical area based at least in part on the prediction errors,
    wherein the data points of the first, second, third, and fourth time series correspond to a same plurality of points in time; and
    wherein, for each of the plurality of points in time, a respective one of the expected values of the third time series at that point in time is inferred based at least in part on a respective one of the actual values of the second time series at that point in time, and a respective one of the prediction errors of the fourth time series at that point in time is determined by comparing the respective one of the expected values of the third time series at that point in time to a respective one of the actual values of the first time series at that point in time.

2. The computer-implemented method of claim 1, further comprising training the machine-learned inference function to infer the expected values.

3. The computer-implemented method of claim 1, further comprising:
    determining a standard deviation of the prediction errors;
    normalizing the prediction errors by dividing the prediction errors by the standard deviation to obtain normalized prediction errors; and
    comparing the normalized prediction errors to a predetermined threshold,
    wherein determining that the anomaly has occurred comprises determining that at least one of the normalized prediction errors exceeds the predetermined threshold.

4. The computer-implemented method of claim 1, wherein the second geographical area is within a predetermined distance from the first geographical area, the method further comprising determining an event in the first geographical area based at least in part on the anomaly.

5. The computer-implemented method of claim 4, further comprising:
    designating the event as a candidate event; and
    determining that the candidate event is a real event using a machine-learned binary classifier.

6. The computer-implemented method of claim 5, further comprising:
    accessing a standing query associated with a user;
    determining that attributes of the real event satisfy the standing query; and
    transmitting a notification of the real event to a client device associated with the user.

7. The computer-implemented method of claim 5, further comprising:
    creating a text summary of the real event; and
    causing presentation of the text summary on a public display situated in a public space within the first geographical area.

8. The computer-implemented method of claim 1, further comprising:
    discretizing an initial geographical area into a plurality of geographical areas, the plurality of geographical areas including the first geographical area and the second geographical area.

9. The computer-implemented method of claim 8, wherein the initial geographical area is discretized into a triangular tessellation such that each geographical area of the plurality of geographical areas is triangular, and the plurality of geographical areas are uniform in size.

10. The computer-implemented method of claim 9, wherein discretizing the initial geographical area comprises creating a hierarchical triangular mesh (HTM) comprising multiple triangular tessellations at different levels of resolution, the method further comprising:
    discretizing time by creating a hierarchy of time intervals at different durations;
    combining each time interval of the hierarchy of time intervals with each level of the different levels of resolution to create a plurality of spatio-temporal resolutions;
    selecting the first geographical area at a spatio-temporal resolution of the plurality of spatio-temporal resolutions; and
    for the first geographical area:
        constructing a time series;
        training the machine-learned inference function; and
        determining that a qualifying condition is met by analyzing the time series to determine that actual values of the time series meet or exceed a threshold.

11. A computer-implemented method comprising:
    collecting a first time series of data points representing actual values of a first type for a first context, and a second time series of data points representing actual values of a second type for the first context or for a second context that is different from the first context, the first type being different than the second type;
    utilizing a machine-learned inference function to infer a third time series of data points representing expected values of the first type for the first context; and
    determining a fourth time series of data points representing prediction errors; and
    determining that an anomaly has occurred in the first context based at least in part on the prediction errors,
    wherein the data points of the first, second, third, and fourth time series correspond to a same plurality of points in time; and
    wherein, for each of the plurality of points in time, a respective one of the expected values of the third time series at that point in time is inferred based at least in part on a respective one of the actual values of the second time series at that point in time, and a respective one of the prediction errors of the fourth time series at that point in time is determined by comparing the respective one of the expected values of the third time series at that point in time to a respective one of the actual values of the first time series at that point in time.

12. The computer-implemented method of claim 11, further comprising training the machine-learned inference function to infer the expected values for the first context.

13. The computer-implemented method of claim 11, further comprising comparing the prediction errors to a predetermined threshold, wherein determining that the anomaly has occurred in the first context comprises determining that at least one of the prediction errors exceeds the predetermined threshold.

14. The computer-implemented method of claim 11, wherein the first context comprises a first geographical area and the second context comprises a second geographical area that is adjacent to the first geographical area, the method further comprising determining an event in the first geographical area based at least in part on the anomaly.

15. The computer-implemented method of claim 14, further comprising:
   designating the event as a candidate event; and
   determining that the candidate event is a real event using a machine-learned binary classifier.

16. A system comprising:
   memory;
   one or more processors; and
   one or more modules stored in the memory and executable by the one or more processors to perform operations comprising:
      collecting a first time series of data points representing actual values for a first geographical area and a second time series of data points representing actual values for a second geographical area that is different from the first geographical area, the actual values of the first time series and the actual values of the second time series being of a same type;
      utilizing a machine-learned inference function, inferring a third time series of data points representing expected values of the same type as the actual values of the first and second time series, the expected values being for the first geographical area;
      determining a fourth time series of data points representing prediction errors for the first geographical area; and
      determining that an anomaly has occurred in the first geographical area based at least in part on the time series of prediction errors,
      wherein the data points of the first, second, third, and fourth time series correspond to a same plurality of points in time; and
      wherein, for each of the plurality of points in time, a respective one of the expected values of the third time series at that point in time is inferred based at least in part on a respective one of the actual values of the second time series at that point in time, and a respective one of the prediction errors of the fourth time series at that point in time is determined by comparing the respective one of the expected values of the third time series at that point in time to a respective one of the actual values of the first time series at that point in time.

17. The system of claim 16, the operations further comprising:
   segmenting an initial geographical area into a plurality of geographical areas, wherein the plurality of geographical areas includes the first geographical area and the second geographical area;
   constructing the second time series of data points representing actual values for the second geographical area;
   constructing the first time series of data points representing actual values for the first geographical area; and
   selecting the first geographical area to analyze for the anomaly.

18. The system of claim 16, the operations further comprising training the machine-learned inference function to infer the third time series of data points representing expected values for the first geographical area as a function of: a time of day, a day of week, and at least the second time series of data points representing actual values.

19. The system of claim 16, the operations further comprising determining an event in the first geographical area based at least in part on the anomaly.

20. The system of claim 19, the operations further comprising:
   designating the event as a candidate event; and
   determining that the candidate event is a real event using a machine-learned binary classifier.

* * * * *